(12) United States Patent
Ha

(10) Patent No.: US 12,231,502 B2
(45) Date of Patent: Feb. 18, 2025

(54) METHOD AND SYSTEM FOR REMOTE COLLABORATION

(71) Applicant: VIRNECT inc., Seoul (KR)

(72) Inventor: Tae Jin Ha, Gimpo-si (KR)

(73) Assignee: VIRNECT INC., Seoul (KR)

(*) Notice: Subject to any disclaimer, the term of this patent is extended or adjusted under 35 U.S.C. 154(b) by 281 days.

(21) Appl. No.: 17/835,619

(22) Filed: Jun. 8, 2022

(65) Prior Publication Data

US 2022/0400155 A1 Dec. 15, 2022

(30) Foreign Application Priority Data

Jun. 9, 2021 (KR) .......................... 10-2021-0074614

(51) Int. Cl.
*H04L 67/125* (2022.01)
*B25J 13/00* (2006.01)
*G06F 3/01* (2006.01)
*G06F 3/0481* (2022.01)
*G06T 19/00* (2011.01)

(52) U.S. Cl.
CPC ............ *H04L 67/125* (2013.01); *B25J 13/00* (2013.01); *G06F 3/011* (2013.01); *G06F 3/0481* (2013.01); *G06T 19/006* (2013.01); *G06T 2219/024* (2013.01)

(58) Field of Classification Search
CPC ....... H04L 67/125; B25J 13/00; B25J 9/1689; G06F 3/011; G06F 3/0481; G06T 19/006; G06T 2219/024; G06T 2200/24; G06T 1/0014; G05B 19/042; G05B 2219/32014; G05B 2219/36159; G05B 2219/39427; G05B 2219/39449; G05B 2219/40169;
(Continued)

(56) References Cited

U.S. PATENT DOCUMENTS 10,878,960 B2 12/2020 Wang et al.
11,052,541 B1* 7/2021 Howard ................... B25J 9/162
(Continued)

FOREIGN PATENT DOCUMENTS

JP 2008259154 A 10/2008
KR 101162703 B1 7/2012
(Continued)

OTHER PUBLICATIONS

Leutert et al., A Spatial Augmented Reality System for Intuitive Display of Robotic Data, IEEE, 2013, pp. 179-180 (Year: 2013).*
(Continued)

*Primary Examiner* — Sze-Hon Kong
(74) *Attorney, Agent, or Firm* — STIP Law Group, LLC

(57) ABSTRACT

A method for a remote collaboration, as a method for providing an augmented reality (AR)-based remote collaboration between a robot located in a worksite, a field worker terminal, and a remote administrator terminal located outside the worksite, includes acquiring a captured image including a field image captured by a robot located at the worksite or a captured image including a user image captured by the field worker terminal, displaying the captured image of the worksite, generating virtual content based on an input of a remote administrator and a field worker with respect to the displayed captured image, and displaying an AR image in which the virtual content is augmented on the displayed captured image.

10 Claims, 16 Drawing Sheets

(58) Field of Classification Search
CPC ...... G06Q 10/103; G06Q 10/20; G06Q 50/10; H04N 7/18

See application file for complete search history.

(56) References Cited

U.S. PATENT DOCUMENTS

| | | | | |
|---|---|---|---|---|
| 11,321,929 | B2* | 5/2022 | Huo | H04L 67/12 |
| 11,417,091 | B2* | 8/2022 | Wright, Jr. | G06F 18/22 |
| 11,481,023 | B2* | 10/2022 | Lee | G06T 7/74 |
| 11,783,345 | B2* | 10/2023 | Pederson | G06F 3/012 |
| | | | | 700/275 |
| 2012/0185095 | A1* | 7/2012 | Rosenstein | G05D 1/0227 |
| | | | | 901/1 |
| 2016/0129593 | A1* | 5/2016 | Wolowelsky | B25J 9/0003 |
| | | | | 901/1 |
| 2016/0291922 | A1* | 10/2016 | Montgomerie | G06F 40/169 |
| 2017/0319282 | A1 | 11/2017 | Jarc et al. | |
| 2019/0355111 | A1* | 11/2019 | Keene | G06V 40/28 |
| 2019/0361589 | A1 | 11/2019 | Yerli | |
| 2020/0193708 | A1* | 6/2020 | Maggiore | H04W 4/029 |
| 2020/0242544 | A1* | 7/2020 | Galluzzo | B25J 9/1692 |
| 2020/0293394 | A1* | 9/2020 | Abhinav | G06T 7/0004 |
| 2020/0388074 | A1* | 12/2020 | Kloor | G06F 21/6209 |
| 2021/0041878 | A1* | 2/2021 | Seifert | G05D 1/0044 |
| 2021/0094180 | A1* | 4/2021 | Szafir | G06V 20/10 |
| 2021/0178576 | A1* | 6/2021 | Murphy | B25J 19/023 |
| 2021/0231750 | A1* | 7/2021 | Chen | G01R 31/69 |
| 2021/0407210 | A1* | 12/2021 | Maggiore | H04W 4/33 |
| 2022/0035903 | A1* | 2/2022 | Kim | B25J 9/1656 |
| 2022/0331966 | A1* | 10/2022 | Kloor | H04N 7/185 |
| 2023/0248470 | A1* | 8/2023 | Crawford | A61B 90/98 |
| | | | | 600/473 |
| 2023/0267417 | A1* | 8/2023 | Kakde | G06Q 10/20 |
| | | | | 715/708 |
| 2024/0148357 | A1* | 5/2024 | Crawford | A61B 8/4254 |
| 2024/0316756 | A1* | 9/2024 | Satou | B25J 9/1664 |

FOREIGN PATENT DOCUMENTS

| | | |
|---|---|---|
| KR | 101478908 B1 | 1/2015 |
| KR | 20210062988 A | 6/2021 |

OTHER PUBLICATIONS

Xiang et al., Mobile projective augmented reality for collaborative robots in construction, Automation in Construction 172, Apr. 26, 2021, pp. 1-15 (Year: 2021).*

Stolzenwald et al., Reach Out and Help: Assisted Remote Collaboration through a Handheld Robot, Oct. 22, 2020, Department of Computer Science, University of Bristol, UK, pp. 1-11 (Year: 2020).*

Druta et al., A Review on Methods and Systems for Remote Collaboration, Oct. 26, 2021, MDPI, pp. 1-28 (Year: 2021).*

The extended European search report of EP 22 17 7912, Oct. 27, 2022.

Sung Ho Choi et al, Situation-dependent remote AR collaborations: Image-based collaboration using a 3D perspective map and live video-based collaboration with a synchronized VR mode, Computers in Industry, 2018, vol. 101, pp. 51-66, Elsevier B. V.Amsterdam, Netherlands.

Kai Fruckel et al, Intuitive Visual Teleoperation for UGVs Using Free-Look Augmented Reality Displays, IEEE International Conference on Robotics and Automation (ICRA), May 2015, pp. 4412-4417, Institute of Electrical and Electronics Engineers, Piscataway, USA.

* cited by examiner

<EXAMPLE IMAGE OF POINT MAP>

500

METHOD AND SYSTEM FOR REMOTE COLLABORATION

BACKGROUND OF THE DISCLOSURE

Technical Field

The present disclosure relates to a method and system for a remote collaboration, and more particularly, to a method and system for a remote collaboration to performing augmented reality (AR)-based communication between multiple users using a robot.

Background Art

In general, field workers in most industrial fields have performed tasks for maintenance and operation of various apparatuses, facilities, or devices.

Manuals for such maintenance or operations are generally produced as books or as 2D images. However, in a manual produced as a book, it is necessary to find a corresponding page for the problem to be solved (e.g., a malfunction of a specific device), and if the manual is outdated, a method presented in the book may not a solution any longer in many cases.

Therefore, in recent years, based on remote computer control technology that allows a certain computer to easily control a computer located in another place, a working method in which a remote administrator may provide guidance for maintenance and work as described above to a field worker has been used.

According to the remote computer control technology, the certain computer may easily process information even in a place independent from a computer to be remotely controlled.

However, in the remote computer control technology of the related art, due to the characteristics of relying on direct communication between a remote administrator and a field worker, a person, that is, a field worker should be located at the site to give a work order or a separate device (e.g., CCTV, etc.) should be provided to observe the corresponding site, causing inconvenience.

In addition, in recent years, in numerous domestic and foreign worksites, the safety of field workers performing work or spaces with high work risk is not smoothly secured, resulting in continuous industrial accidents.

In other words, various risk factors that cause accidents are scattered in industrial sites, but in order to receive or perform work orders from remote administrators, field workers should take these risks and directly enter hazardous areas or perform tasks that involve risks.

In addition, the work efficiency and productivity of workers who are in charge of each field equipment part in an industrial plant are significantly affected according to a skill level of an assembly production process they are in charge of.

In particular, in the case of unskilled workers, it may be difficult to perform tasks such as process assembly in the equipment parts that they are responsible for alone, which leads to a decrease in productivity of overall product production, and thus, a method for effectively providing an appropriate work guidance is required.

In addition, even skilled workers may not be able to immediately recognize a change in contents of work instructions and there is a problem of a temporal delay due to a direct instruction of the contents of work instructions through administrators each time.

In addition, since the field workers wear various items such as work helmet and dust-proof clothes and due to the occurrence of noise in the work plant, it may be difficult for the field workers to communication with the outside.

Meanwhile, with the recent development of information and communication technology (ICT), information provision technology that provides information on various fields to multiple subscribers in real time through at least one host server via a long-distance data communication network has been actively developed.

In addition, as interest in virtual reality (VR) or augmented reality (AR) has increased in recent years, the market for services and devices that provide users' immersive experiences has been developed day by day.

Thanks to this trend, in recent various industrial fields, various AR data related to the corresponding industrial fields have been created and managed, and when necessary, communication of exchanging data generated based on a wired/wireless network has been carried out.

Meanwhile, in recent years, as the necessity in various industrial fields increases, technology development for intelligent robots has been actively performed.

Here, the intelligent robot refers to a robot that recognizes an external environment (perception), determines the situation by itself (cognition), and operates autonomously (manipulation).

In other words, the intelligent robot is different from an existing robot in that a situation determination function and autonomous operation function are added. Here, the situation determination function is divided into an environment recognition function and a location recognition function, and the autonomous operation function may be divided into an operation control function and an autonomous movement function.

Therefore, it is necessary to consider the introduction of a technology that may solve the aforementioned problems that may occur in the industrial field based on the development of the intelligent robot as described above.

RELATED ART DOCUMENT

Patent Document (Patent document 1) KR 10-1478908 B1

SUMMARY

Technical Problem

An aspect of the present disclosure provides a method and system for a remote collaboration for performing augmented reality (AR)-based communication between multiple users using a robot.

Specifically, an aspect of the present disclosure provides a method and system for a remote collaboration in which an administrator located remotely from a worksite and a worker located at the worksite perform AR-based communication using a robot that patrols the worksite.

In addition, an aspect of the present disclosure provides method and system for a remote collaboration to perform AR-based communication based on images captured using various image sensors including an image sensor of a robot, an image sensor of a display device included in the robot, an image sensor of a terminal of a field worker, and/or a predetermined image sensor installed in the field.

In addition, an aspect of the present disclosure provides a method and system for a remote collaboration to perform AR-based communication based on a base map for a worksite to be monitored.

However, the technical problems to be achieved by the present disclosure and embodiments of the present disclosure are not limited to the technical problems described above, and other technical problems may exist.

Technical Solution

According to an embodiment of the present disclosure, a method for a remote collaboration, as a method for providing an augmented reality (AR)-based remote collaboration between a robot located in a worksite, a field worker terminal, and a remote administrator terminal located outside the worksite, includes: acquiring a captured image including a field image captured by a robot located at the worksite or a captured image including a user image captured by the field worker terminal; displaying the captured image of the worksite; generating virtual content based on an input of a remote administrator and a field worker with respect to the displayed captured image; and displaying an AR image in which the virtual content is augmented on the displayed captured image.

The generating of the virtual content based on the input of the remote administrator and the field worker with respect to the displayed captured image may include: acquiring virtual content that visualizes work guidance to be transferred from the remote administrator terminal to the field worker, wherein the work guidance may include at least one of text, pointing, image, drawing, and voice data based on a user input of the remote administrator terminal.

The generating of the virtual content based on the input of the remote administrator and the field worker with respect to the displayed captured image may include: obtaining virtual content that visualizes a work feedback to be displayed on the remote administrator terminal from the field worker terminal, wherein the work feedback may include at least one of text, pointing, image, drawing, and voice data based on a user input of the field worker terminal.

The displaying of the AR image in which the virtual content is augmented on the displayed captured image may include at least one of displaying the AR image in the field worker terminal; displaying the AR image in the remote administrator terminal; and the AR image on a display device disposed on the robot.

The display device may be a computing device detachably disposed in a body of the robot and connected to the robot for wireless or wired communication, and the acquiring of the captured image may include acquiring a sub-field image captured by a display device detachable from the robot.

The generating of the virtual content based on an input of the remote administrator and the field worker for the displayed captured image may include: displaying the field image in the remote administrator terminal and generating the virtual content according to the input of the remote administrator from the displayed field image, and the displaying of the AR image on the display device disposed on the robot may include displaying an AR image in which the virtual content is augmented on the field image captured by the robot.

The method may further include: separating the display device from the robot; activating a real-time movement direction input interface for controlling movement of the robot in the display device; controlling the robot to move based on a user input to the real-time movement direction input interface; and acquiring a real-time field image captured by the moved robot and displaying the real-time field image on the display device and the remote administrator terminal.

The method may further include: receiving work guidance for a point or object other than the real-time field image from the remote administrator terminal; and augmenting and displaying virtual content for guiding a location of the work guidance in the real-time field image.

The virtual content for guiding a position of the work guidance may be a navigation image indicating a direction in which the robot is to move in order to image a position of the point or object.

The method may further include: receiving a work guidance for a past field image captured by the robot before moving from the remote administrator terminal; and comparing the real-time field image captured by the robot with the past field image and determining a display position of the work guidance in the real-time field image.

The method may further include: displaying a base map for the worksite in the remote administrator terminal; receiving a user input from the remote administrator terminal for the displayed base map; and augmenting and displaying virtual content on the captured image based on the received user input.

The receiving of a user input from the remote administrator terminal for the displayed base map may include: receiving a work guidance for a predetermined point or a predetermined object in the base map, and the augmenting and displaying of virtual content on the captured image based on the received user input may include: acquiring the captured image of a target area including the predetermined point or the predetermined object; determining a display position of the work guidance based on the acquired captured image; and outputting the captured image augmented with the virtual content representing the work guidance based on the determined display position.

The acquiring of the captured image for the area including the predetermined point or the predetermined object may include: controlling an image capture direction of the display device disposed on the robot to image the target area; and controlling movement of the robot to image the target area.

According to another embodiment of the present disclosure, a system for a remote collaboration includes: a communication unit configured to communicate with a computing device including a field worker terminal located in a worksite and a remote administrator terminal located outside the worksite; a sensor unit configured to sense a peripheral area of the robot located at the worksite; a display device configured to output a graphic image in a form detachable to the robot; and a controller including a processor for providing the robot-based remote collaboration service, wherein the processor is configured to acquire a captured image including a field image captured by the robot and a user image captured by the field worker terminal by controlling at least one of the sensor unit and the communication unit, display the captured image of the worksite by controlling at least one of the communication unit and the display device, generate virtual content based on an input of the remote administrator and the field worker for the displayed captured image by controlling the communication unit, and display an augmented reality (AR) image in which the virtual content is augmented in the displayed captured image by controlling at least one of the communication unit and the display device.

Advantageous Effects

The method and system for a remote collaboration according to an embodiment of the present disclosure may perform augmented reality (AR)-based communication between multiple users using a robot to support AR-based communication for the worksite even if manpower is directly put into a hazardous worksite where various accident-inducing factors are scattered or hazardous substances exist or even if there is no separate device (e.g., CCTV, etc.) for observing the worksite, thereby security safety in the field and improving work efficiency.

In addition, the method and system for a remote collaboration according to an embodiment of the present disclosure perform AR-based communication between multiple users based on a robot to efficiently provide various data and/or information required for work to the corresponding worksite, thereby improving work efficiency.

In addition, the method and system for a remote collaboration according to an embodiment of the present disclosure allow an administrator located remotely from a worksite and a worker located in the worksite to perform AR-based communication using a robot, thereby easily transferring equipment (e.g., a valve wrench or calibrator, etc.), which is inconvenient to be delivered through manpower, through the robot.

In addition, the method and system for a remote collaboration according to an embodiment of the present disclosure perform AR-based communication based on images captured using various image sensors including an image sensor of a robot, an image sensor of a display device included in the robot, an image sensor of a terminal of a field worker, and/or a predetermined image sensor installed in the field to display and provide, as virtual content, AR-based work information related to a region in a worksite, for which a work guidance is to be provided, on an image of the corresponding region, thereby providing communication data mutually exchanged in a form that may be easily and clearly recognized even in a work environment where communication is difficult.

In addition, the method and system for a remote collaboration according to an embodiment of the present disclosure perform AR-based communication based on a base map for a worksite to be monitored so that a remote administrator and/or a field worker recognize a status of the worksite in real time from a macroscopic point of view and easily exchange interrelated information.

However, the effects obtainable in the present disclosure are not limited to the aforementioned effects, and other effects not mentioned may be clearly understood from the description below.

DESCRIPTION OF EXEMPLARY EMBODIMENTS

Figure 1:
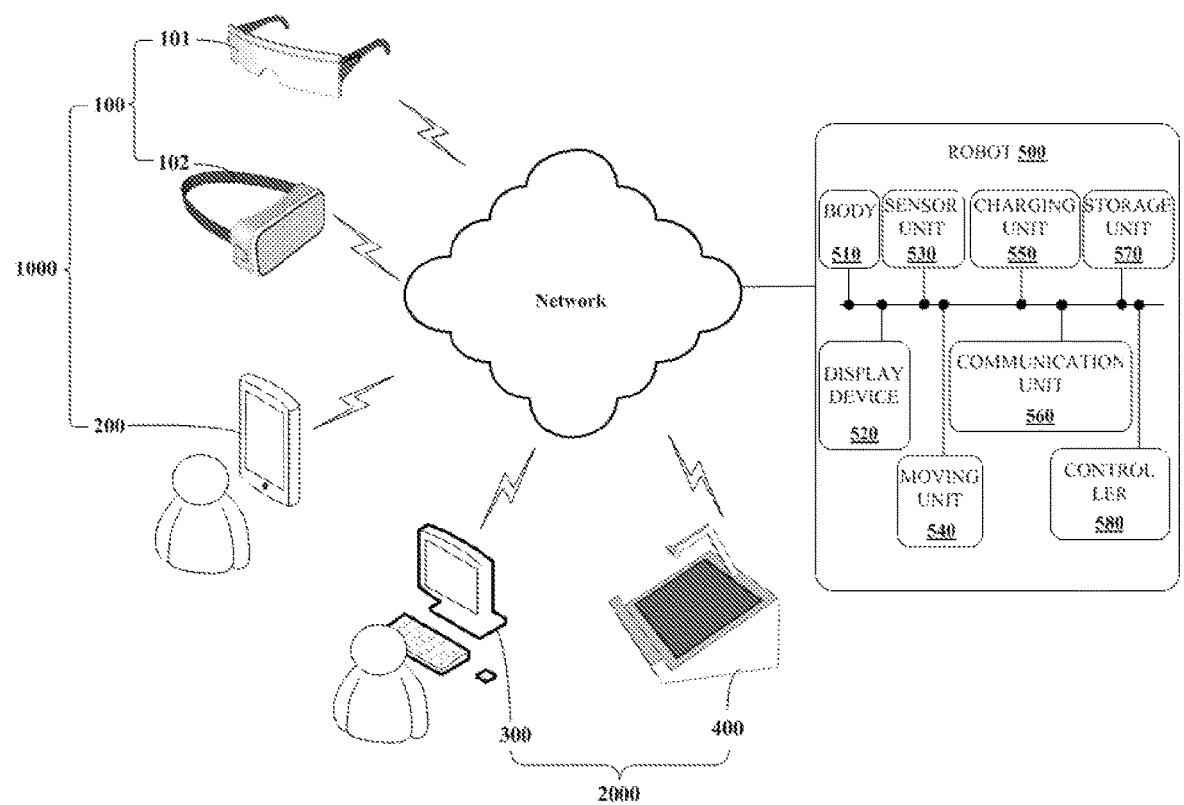
FIG. 1 is a conceptual diagram of a system for a remote collaboration based on a robot according to an embodiment of the present disclosure.

As the inventive concept allows for various changes and numerous embodiments, particular embodiments will be illustrated in the drawings and described in detail in the written description. Effects and features of the present disclosure, and a method for achieving them will become apparent with reference to the embodiments described below in detail in conjunction with the drawings. However, the present disclosure is not limited to the embodiments disclosed below and may be implemented in various forms. In the following embodiments, terms such as first, second, etc. Are used for the purpose of distinguishing one component from another, not in a limiting sense. Also, a singular expression includes a plural expression unless the context clearly dictates otherwise. In addition, terms such as "including" or "having" means that the features or components described in the specification are present, and do not preclude the possibility that one or more other features or components will be added. In addition, in the drawings, the size of the components may be exaggerated or reduced for convenience of description. For example, the size and thickness of each component shown in the drawings are arbitrarily indicated for convenience of description, so the present disclosure is not limited thereto.

Hereinafter, embodiments of the present disclosure will be described in detail with reference to the accompanying drawings, and when described with reference to the drawings, the same or corresponding components are given the same reference numerals, and repeated descriptions thereof will be omitted.

FIG. 1 is a conceptual diagram of a system for a remote collaboration based on a robot according to an embodiment of the present disclosure.

System for Remote Collaboration Based on Robot

A system for a remote collaboration based on a robot according to an embodiment of the present disclosure is a system for providing a robot-based remote collaboration service to perform augmented reality (AR)-based communication between remotely located multiple users using a robot.

Here, the AR-based communication according to the embodiment may refer to communication for at least one remote administrator and at least one field worker to exchange predetermined work guidance and/or work feedback in an AR environment to perform a remote collaboration.

In this case, the AR environment according to the embodiment may refer to an environment generated by inserting virtual content related to a physical space around a user or a communication counterpart.

Here, the virtual content according to the embodiment is virtual content generated by a predetermined computing device, and may include, for example, a label, text information, an image, a drawing object, and/or a 3D entity and may BE a predetermined physical space or augmented content generated in response to an image obtained by imaging the physical space.

That is, the AR-based communication according to the embodiment refers to an activity of exchanging communication data for intercommunication between different users through a computing device and/or a robot based on immersive media (e.g., video and/or voice, etc.) including the above virtual content.

In this case, the communication data according to an embodiment may include voice, video, and/or virtual content exchanged between computing devices of different users (e.g., the remote administrator and the field worker) through a network.

In an embodiment, the communication data may include AR-based work information by the remote administrator and/or AR-based feedback information by the field worker, and the like, and may be transmitted and received based on a network by the computing device and/or robot according to the embodiment.

Therefore, the system for a remote collaboration based on a robot according to an embodiment of the present disclosure may perform communication via virtual content related to a physical space or a captured image as an additional medium along with voice and image, which are communication medium of general communication, and in the process, the performance of AR-based communication between the multi-users may be further improved by using the robot.

FIG. 1 is a conceptual diagram of a system for a remote collaboration based on a robot according to an embodiment of the present disclosure.

Referring to FIG. 1, a system for a remote collaboration based on a robot according to an embodiment of the present disclosure may include a computing device and a robot 500.

Here, the computing device and the robot 500 may be connected through a network.

In this case, the network refers to a connection structure in which each node, such as a computing device and/or the robot 500, etc., may exchange information with each other, and an example of such a network includes a 3GPP (3rd Generation Partnership Project) network, an LTE (Long Term Evolution) network, a WIMAX (World Interoperability for Microwave Access) network, the Internet, LAN (Local Area Network), wireless LAN (Wireless Local Area Network), WAN (Wide Area Network), PAN (Personal Area Network), a Bluetooth (Bluetooth) network, a satellite broadcasting network, an analog broadcasting network, a digital multimedia broadcasting (DMB) network, etc. But is not limited thereto.

Hereinafter, the computing device and the robot 500 implementing a robot-based information collecting system will be described in detail with reference to the accompanying drawings.

Computing Device

A computing device according to an embodiment of the present disclosure may be a computing device equipped with a monitoring application that monitors a certain worksite using the robot 500 located at the corresponding worksite from a remote location and providing the robot-based information collecting service for sharing related data between users.

In an exemplary implementation, the monitoring application of the computing device may acquire an image of the computing device 100 of another user and/or the robot 500 through a predetermined display device and output the acquired image, and may receive a user input corresponding to the image and generate virtual content corresponding to the image according to the received user input.

In addition, the monitoring application may receive data from a sensor system in a physical space of the image or a previously matched virtual content source, and generate the received data as virtual content matched with the image.

In addition, the monitoring application may provide an augmented reality environment to the user by outputting the generated virtual content on an image output from the display device in an overlaying manner.

In addition, the monitoring application may transmit the generated virtual content as communication data through a predetermined communication module, to utilize the virtual content corresponding to the physical space as well as voice and image as a communication medium.

However, according to embodiments, at least some of the functional operations performed by the computing device to provide the robot-based information collecting service may be performed by the robot 500, which will be described later, in various embodiments.

Hereinafter, the computing device according to an embodiment will be described separately according to a subject, environment, and/or purpose.

In detail, in an embodiment, the computing device may include a field user terminal 1000 used by a field worker and a remote administrator terminal 2000 used by a remote administrator.

Here, the remote administrator according to an embodiment may be a person who provides a work guidance for instructing or assisting work of a field worker performing work at the worksite, based on virtual content, etc. From a location remote from a predetermined worksite.

In addition, the field worker according to an embodiment may be a person who is located at a predetermined worksite and performs an actual work based on the virtual content-based work guidance.

In this case, in an embodiment, the field user terminal 1000 may include a field monitoring application that is a monitoring application installed in the field user terminal 1000, and the remote administrator terminal 2000 may include a remote monitoring application, which is a monitoring application installed in the remote administrator terminal 2000.

Also, in an embodiment, the computing device may include various types of computing devices (e.g., a wearable type, a mobile type, a desktop type, or a tabletop type) in which the monitoring application is installed.

1. Wearable Type Computing Device 100: 101, 102

In an embodiment of the present disclosure, the wearable type computing device 100 may be used as the field user terminal 1000.

In detail, the wearable type computing device 100 according to an embodiment may include a wearable type computing device 100 such as smart glass display 101 or a head mounted display (HMD) 102.

The smart glasses type computing device 101 may include a display system including glasses that displays virtual content (in an embodiment, augmented reality (AR)-based work information, etc.) on the user's field of view, while transmitting light so that the user may view a surrounding physical space, while worn.

Specifically, the computing device 101 of an embodiment may include a transparent glass display that transmits light from a surrounding physical space to reach the user's eyes, while at the same time reflecting the virtual content displayed by the display system towards the user's eyes.

In this case, the virtual content may include visual content such as an image or video that may be displayed in a portion of the user's field of view in the smart glass type computing device 101.

For example, the virtual content may include virtual object images overlaying various portions of the physical space. This virtual object image may be rendered to a 2D image or a 3D image.

Meanwhile, the head-mounted display type computing device 102 may block light to the surrounding physical space so that the displayed image may be viewed only by the display system.

The head-mounted display type computing device 102 may output a 3D image by outputting different images with an offset in parallax to each of the left and right eye displays in order to recognize a 3D scene.

In addition, the head-mounted display type computing device 102 may also provide an augmented reality environment by outputting an image of the surrounding physical space and virtual content generated based on the captured image as a 3D image.

Hereinafter, specific components will be described based on the smart glass type computing device 101, among the wearable type computing devices 100.

Figure 2:
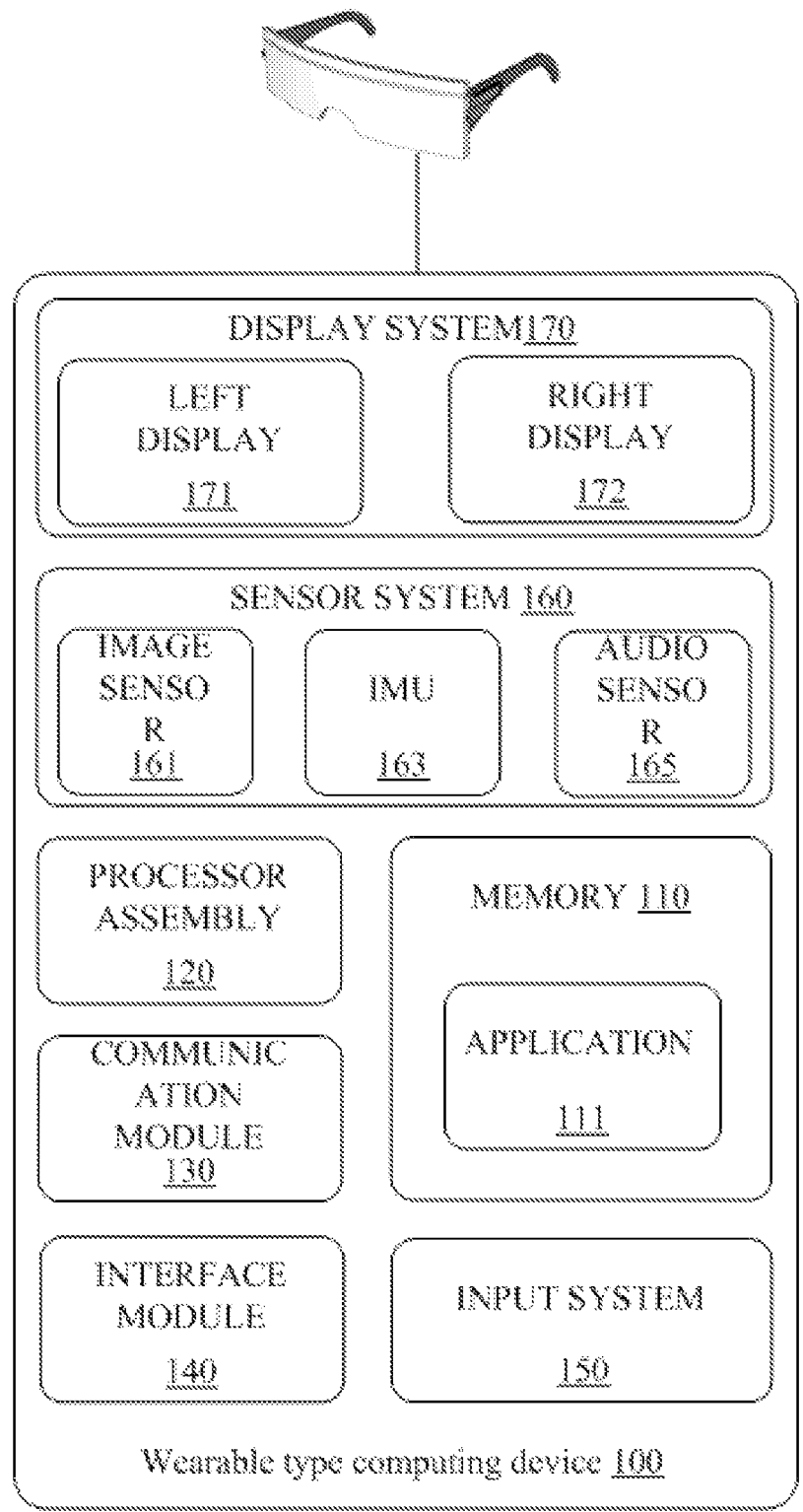
FIG. 2 is an internal block diagram of a wearable type computing device according to an embodiment of the present disclosure.

FIG. 2 is an internal block diagram of the wearable type computing device 100 according to an embodiment of the present disclosure.

Referring to FIG. 2, the smart glass type computing device 101 according to an exemplary implementation may include a memory 110 including a monitoring application, a processor assembly 120, a communication module 130, an interface module 140, an input system 150, a sensor system 160, and a display system 170. In addition, the components may be implemented to be included in a housing of the smart glass type computing device 101.

The memory 110 stores a monitoring application 111, and the monitoring application 111 may include virtual content, an image buffer, a location engine, a virtual content display engine, and the like for providing the robot-based information collecting service.

That is, the memory 110 may store commands and data that may be used to provide the robot-based information collecting service.

In an embodiment, the monitoring application 111 may include a communication application for performing communication based on an augmented reality (AR) environment.

Here, the communication application may include various applications, engines, data, and commands for providing AR-based communication services between multiple users.

Also, the memory 110 may include at least one non-transitory computer-readable storage media and a temporary computer-readable storage medium.

For example, the memory 110 may be various storage devices such as ROM, EPROM, flash drive, hard drive, and the like, and may include a web storage that performs a storage function of the memory 110 on the Internet (web storage).

The processor assembly 120 may include at least one processor capable of executing commands of the monitoring application 111 stored in the memory 110 to perform various tasks for providing the robot-based information collecting service.

In an embodiment, the processor assembly 120 may control an overall operation of the components through the monitoring application 111 of the memory 110 in order to provide the robot-based information collecting service.

For example, the processor assembly 120 may recognize a real object from an image obtained based on a predetermined image sensor, and may control the components of the smart glass type computing device 101 to generate and display an AR image obtained by matching a virtual content to the recognized real object.

The processor assembly 120 may include a central processing unit (CPU) and/or a graphics processor unit (GPU). In addition, the processor assembly 120 may be implemented to include at least one of ASICs (application specific integrated circuits), DSPs (digital signal processors), DSPDs (digital signal processing devices), PLDs (programmable logic devices), FPGAs (field programmable gate arrays), controllers, micro-controllers, microprocessors, and other electrical units for performing other functions.

The communication module 130 may include one or more devices for communicating with other computing devices (e.g., the robot 500, etc.). The communication module 130 may communicate through a wireless network.

In an embodiment, the communication module 130 may communicate with a computing device storing a virtual content source for providing the robot-based information collecting service, and may communicate with various user input components such as a controller that receives a user input.

In an embodiment, the communication module 130 may transmit/receive various data related to the robot-based information collecting service with the robot 500 and/or other computing devices 100.

Such a communication module 130 may transmit and receive data to and from at least one of a base station, an external terminal, and a certain server wirelessly on a mobile communication network established through a communication device capable of performing the technical standards or communication methods for mobile communication (e.g., long term evolution (LTE), LTE-advanced (LTE-A), 5G new radio (NR), or WIFI) or a short-range communication method.

The sensor system 160 may include various sensors such as an image sensor 161, a location sensor (IMU) 163, an audio sensor, a distance sensor, a proximity sensor, and a contact sensor.

The image sensor 161 may capture an image and/or a video of the physical space around the smart glass type computing device 101.

In an embodiment, the image sensor 161 may capture and acquire an image related to the robot-based information collecting service.

In addition, the image sensor 161 may be disposed on the front or/and rear side of the smart glass type computing device 101 and may acquire an image by imaging a disposed direction side, and may image a physical space such as a worksite through a camera disposed toward the outside of the smart glass type computing device 101.

The image sensor 161 may include an image sensor 161 and an image processing module. In detail, the image sensor 161 may process a still image or a video obtained by the image sensor 161 (e.g., CMOS or CCD).

Also, the image sensor 161 may process a still image or a video obtained through the image sensor 161 using an image processing module to extract necessary information, and transmit the extracted information to a processor.

The image sensor 161 may be a camera assembly including at least one camera. The camera assembly may include a general camera that images a visible light band, and may further include a special camera such as an infrared camera or a stereo camera.

The IMU 163 may detect at least one of motion and acceleration of the smart glass type computing device 101. For example, the IMU 163 may include a combination of various location sensors such as an accelerometer, a gyroscope, and a magnetometer.

In addition, the IMU may interwork with the location communication module 130 such as GPS of the communication module 130 to recognize spatial information on the physical space around the smart glass type computing device 101.

In addition, the IMU 163 may detect information for detecting and tracking the user's gaze direction and head motion based on the detected location and direction.

Further, in some implementations, the monitoring application 111 may determine a user's location and direction in a physical space or recognize features or an object in the physical space by using the IMU 163 and the image sensor 161.

The audio sensor 165 may recognize a sound around the smart glass type computing device 101.

In detail, the audio sensor 165 may include a microphone capable of detecting the user's voice input of the smart glass type computing device 101.

In an embodiment, the audio sensor 165 may receive voice data of communication data to be transmitted through an AR-based communication service from the user.

The interface module 140 may communicatively connect the smart glass type computing device 101 with one or more other devices.

Specifically, the interface module 140 may include wired and/or wireless communication devices that are compatible with one or more different communication protocols.

The smart glass type computing device 101 may be connected to various input/output devices through the interface module 140.

For example, the interface module 140 may be connected to an audio output device such as a headset port or a speaker to output audio.

Although it has been described as an example that the audio output device is connected through the interface module 140, an embodiment in which the audio output device is installed in the smart glass type computing device 101 may also be included.

This interface module 140 may include at least one of a wired/wireless headset port, an external charger port), a wired/wireless data port, a memory card port, a port for connecting a device equipped with an identification module, an audio input/output (I/O) port, a video I/O port, an earphone port, a power amplifier, an RF circuit, a transceiver and other communication circuits.

The input system 150 may detect a user's input (e.g., a gesture, a voice command, operation of a button, or other type of input) related to the robot-based information collecting service.

Specifically, the input system 150 may include a button, a touch sensor, and an image sensor 161 that receives a user motion input.

Also, the input system 150 may be connected to an external controller through the interface module 140 to receive a user's input.

The display system 170 may include a transparent glass display that transmits light from the physical space around the smart glass type computing device 101 to reach the user's eyes and at the same time reflects the virtual content displayed by the display system 170 towards the user's eyes.

The display system 170 may include a left display 171 corresponding to the left eye of the user wearing the smart glass type computing device 101 and a right display 172 corresponding to the right eye of the user, and the left display 171 and the right display 172 may output different images with an offset to the parallax as virtual content, so that the user may recognize the virtual content as a three-dimensional (3D) image.

In an embodiment, the display system 170 may output various information related to the robot-based information collecting service as a graphic image.

Such displays may include at least one of a liquid crystal display (LCD), a thin film transistor-liquid crystal display (TFT LCD), an organic light-emitting diode (OLED), and a flexible display, a 3D display, and an electronic ink display (e-ink display).

The wearable type smart glass type computing device 101 may be advantageous for use by field workers located in a physical space such as a worksite.

2. Mobile Type Computing Device 200

In an embodiment of the present disclosure, the mobile type computing device 200 may be used as the field user terminal 1000.

In detail, in another example, the computing device 100 may be a mobile device such as a smartphone or a tablet PC on which a monitoring application is installed. The mobile type computing device 200 may capture an image of a surrounding physical space with an image sensor and display the captured image and virtual content displayed to be matched with the physical space may be displayed to provide an AR environment to the user.

Figure 4:
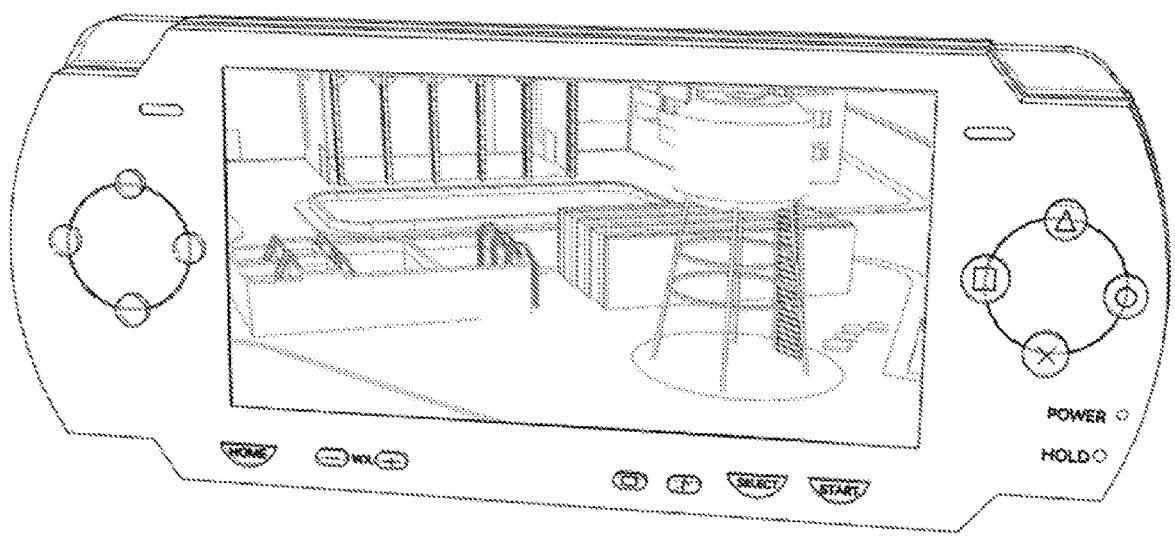
FIG. 4 is an example showing an appearance of a joystick type terminal according to an embodiment of the present disclosure.

For example, the mobile type computing device 200 may include a joystick type terminal as shown in FIG. 4, or a smartphone, a mobile phone, a digital broadcasting terminal, personal digital assistants (PDA), a portable multimedia player (PMP), a tablet PC and the like.

Figure 3:
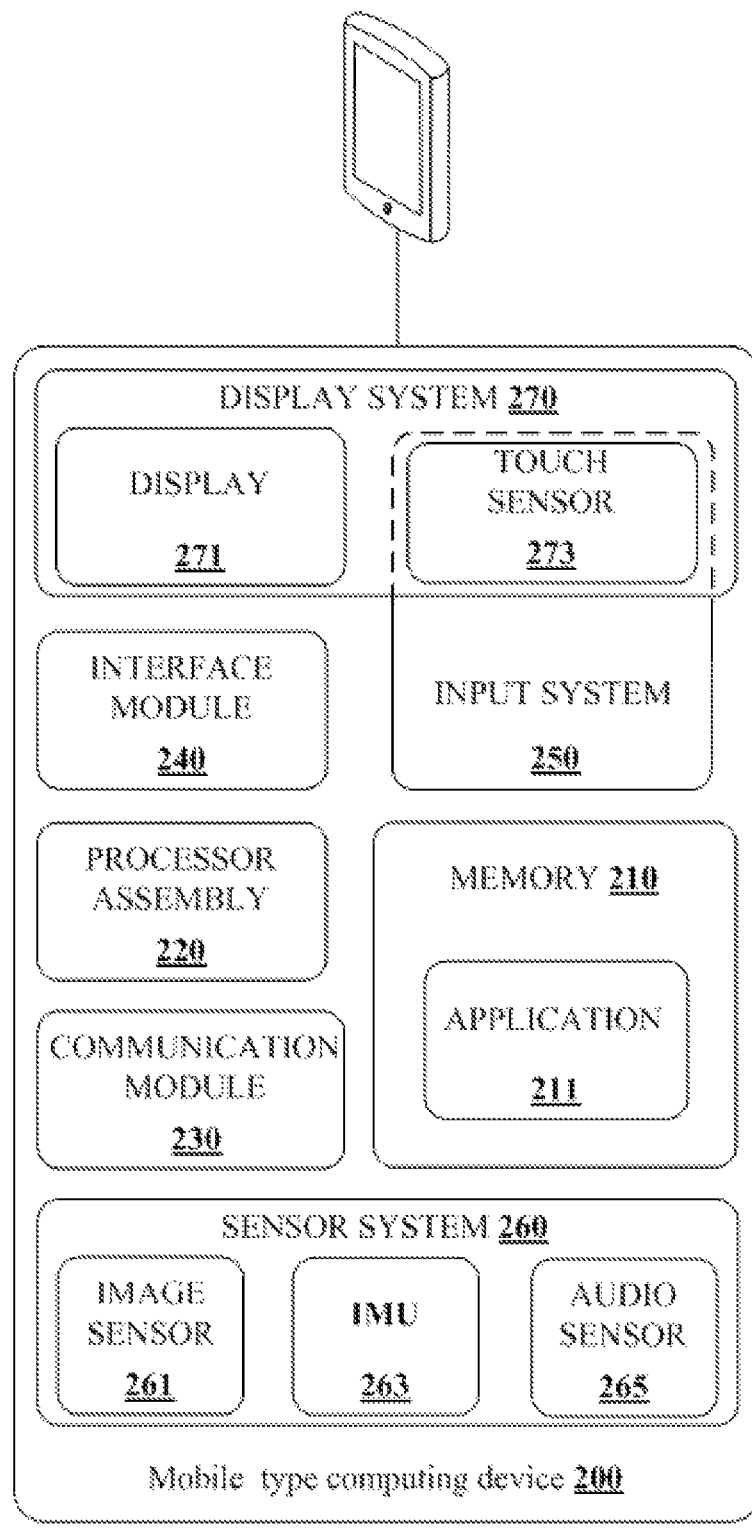
FIG. 3 is an internal block diagram of a mobile type computing device according to an embodiment of the present disclosure.

FIG. 3 is an internal block diagram of a mobile type computing device according to an embodiment of the present disclosure.

Referring to FIG. 3, a mobile type computing device 200 according to an exemplary implementation may include a memory 210, a processor assembly 220, a communication module 230, an interface module 240, an input system 250, a sensor system 260, and a display system 270. These components may be configured to be included within a housing of the computing device 200.

In the description of the components of the mobile type computing device 200, the repeated contents will be replaced with the description of the components of the smart glass type computing device 101. Hereinafter, a difference from the smart glass type computing device 101 will be mainly described.

The above components may be disposed within the housing of the mobile type computing device 200, and a user interface may include a touch sensor 273 on a display 271 configured to receive a user touch input.

In detail, the display system 270 may include a display 271 that outputs an image and a touch sensor 273 that detects a user's touch input.

For example, the display 271 may form an overlaid structure with the touch sensor 273 or integrally formed to be implemented as a touch screen. Such a touch screen may function as a user input unit that provides an input interface between the computing device 200 and the user, and may provide an output interface between the computing device 200 and the user.

Also, the sensor system 260 may include an image sensor 261, and for example, the image sensor 261 may be disposed on one side and the other side of the housing of the computing device 200.

In this case, the image sensor on one side may be oriented toward a physical space to capture an image imaging the physical space, and the image sensor on the other side may be oriented toward the user side to capture the user's view, gesture, and the like.

In addition, the input system 250 may detect a user's input (e.g., a gesture, a voice command, operation of a button, or other type of input) related to the robot-based information collecting service.

Specifically, the input system 250 may include a button, a joystick, a touch sensor, and an image sensor 161 for receiving a user motion input.

Also, the input system 250 may be connected to an external controller through the interface module 240 to receive a user's input.

The mobile type computing device 200 may be suitable for a field worker located in a physical space, such as a worksite.

3. Desktop Type Computing Device 300

In an embodiment of the present disclosure, the desktop type computing device 300 may be used as the remote administrator terminal 2000.

In another example, the desktop type computing device 300 may further include a device in which a program for executing the robot-based information collecting service is installed based on wired/wireless communication, such as a fixed desktop PC in which the monitoring application 311 is installed, a laptop computer, a personal computer such as an ultrabook, etc.

The desktop type computing device 300 may receive a captured image of a surrounding physical space from the computing device 100 of another user, and augments and displays the received image and virtual content matched to the physical space, thereby providing a robot based information collecting service to the user.

Figure 5:
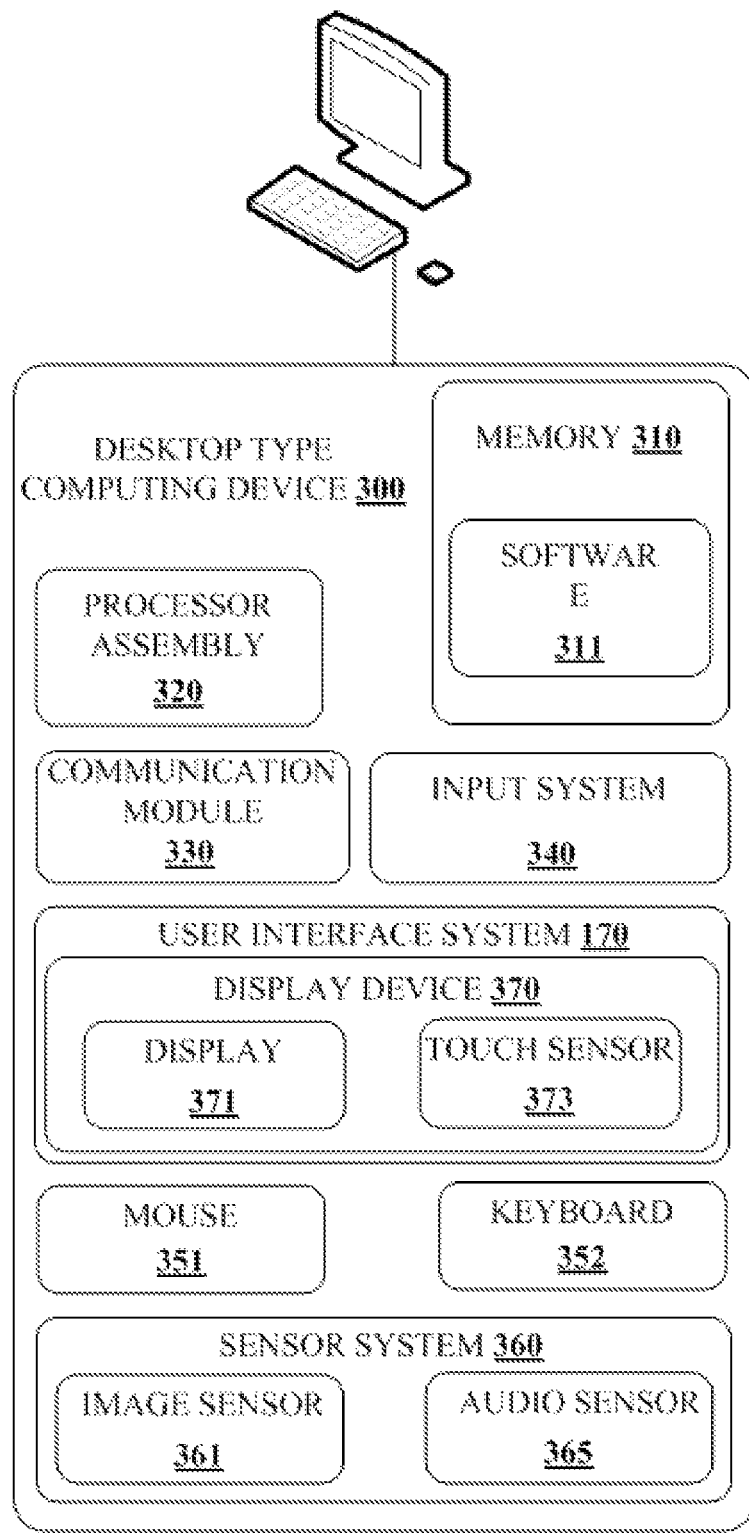
FIG. 5 is an internal block diagram of a desktop type computing device according to an embodiment of the present disclosure.

FIG. 5 is an internal block diagram of a desktop type computing device according to an embodiment of the present disclosure.

Referring to FIG. 5, the desktop type computing device 300 according to an exemplary implementation may include a memory 310, a processor assembly 320, a communication module 330, a user interface system 350, and an input system 340. These components may be configured to be included within a housing of the computing device 300.

In the description of the above components of the desktop type computing device, the repeated contents will be replaced with the description of the components of the smart glass type computing device 101. Hereinafter, the differences from the smart glass type computing device 101 will be mainly described.

In detail, the desktop type computing device 300 may include the user interface system 350 to receive a user input (e.g., a touch input, a mouse input, a keyboard input, a gesture input, a motion input using a guide tool, etc.).

As an example, the computing device 300 may be connected to at least one of a mouse 351, a keyboard 352, a gesture input controller, an image sensor 361 (e.g., a camera), and an audio sensor using the user interface system 350 with various communication protocols to acquire a user input.

In addition, the desktop type computing device 300 may be connected to an external output device through the user interface system 350, for example, the display device 370, an audio output device, or the like.

Such a desktop type computing device 300 may be advantageously used by a remote administrator that remotely transmits instructions or necessary information in conjunction with the computing devices 100 and 200 of the field worker.

4. Tabletop Type Computing Device 400

In an embodiment of the present disclosure, the tabletop type computing device 400 may be used as a sub-administrator computing device.

According to another exemplary implementation, the tabletop type computing device 400 may be implemented as a tabletop shape having a new shape and structure different from that of the existing desktop type computing device 300, and in this case, the robot-based information collecting service may be provided through a system included in a tabletop.

In detail, the tabletop type computing device 400 may refer to a device providing an interface system allowing a remote administrator to easily check an image received from the computing device 100 of another user (e.g., a field worker in an embodiment) and easily input guidance for an object displayed in the corresponding image based on virtual content.

That is, the tabletop type computing device 400 may provide an AR environment to the user by outputting a captured image acquired from the computing device 100 of another user and virtual content related to the captured image through a predetermined display system.

Hereinafter, repeated contents in the description of the components of the tabletop type computing device 400 will be replaced with the description of the components of the desktop type computing device 300, and differences from the desktop type computing device 300 will be mainly described.

Figure 6:
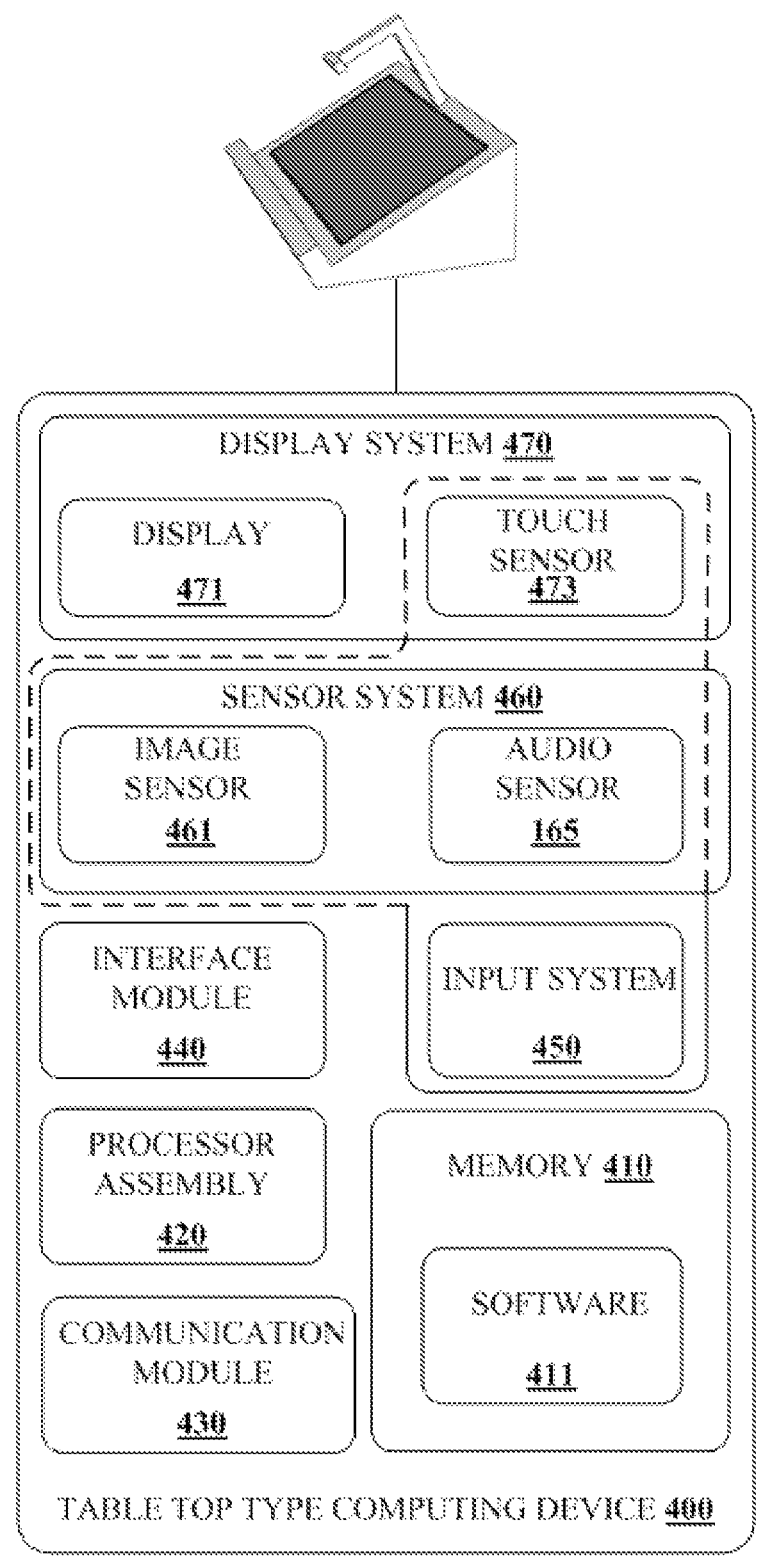
FIG. 6 is an internal block diagram of a tabletop type computing device according to an embodiment of the present disclosure.

FIG. 6 is an internal block diagram of a tabletop type computing device according to an embodiment of the present disclosure.

Referring to FIG. 6, the exemplary tabletop type computing device 400 may include a memory 410, a processor assembly 420, a communication module 430, an interface module 440, an input system 450, a sensor system 460, and a display system 470.

These components may be configured to be included within a housing of the computing device 400.

In addition, the tabletop type computing device 400 may provide an I/O interface for receiving a touch input such as the user's pointing and dragging for a captured image through a touch sensor 473 on a display 471 of the display system 470.

In addition, the tabletop type computing device 400 may receive a gesture input of a user's hand through the sensor system 460 (e.g., an image sensor 461) disposed on the display system 470, and may receive a motion input according to a guide tool. The gesture input and the motion input of the guide tool may also be input to the display 471 in response to the captured image, and the tabletop type computing device 400 may detect the user input by matching the input to a real object image displayed in the captured image.

That is, a monitoring application 411 of the tabletop type computing device 400 according to an embodiment may execute a series of processes for implementing a service provided by visualizing virtual content based on a user input acquired through the sensor system 460. In this case, by providing an I/O interface for performing a user input in response to the captured image displayed on the display, the user may perform input more intuitively for the captured image.

Robot: 500

The robot 500 according to an embodiment of the present disclosure may be an intelligent robot that recognizes an external environment (perception), determines a situation by itself (cognition), and autonomously operates (manipulation).

In this case, a situation determination function of the robot 500 may include an environment recognition function and a location recognition function, and the autonomous operation function may include a manipulation control function and an autonomous movement function.

Hereinafter, elements constituting the robot 500 according to an embodiment of the present disclosure will be described in detail with reference to the accompanying drawings.

However, the components shown in FIG. 1 are not essential to the robot 500, and the robot 500 may be implemented with more components or fewer components.

Referring further to FIG. 1, in an embodiment of the present disclosure, the robot 500 may include a body 510, a display device 520, a sensor unit 530, a moving unit 540, a charging unit 550, a communication unit 560, a storage unit 570, and a controller 580.

In detail, the body 510 of the robot 500 may form the exterior of the robot 500 and may include various units necessary for driving the robot 500 inside/outside.

In an embodiment, the body 510 may include a fixing part (e.g., a fixing support, a pressure screw and/or a fixing support direction changing motor, etc.) for detachably fixing the display device 520 to be described later. In this case, the fixing part may further include a gimbal device for minimizing deterioration in quality of an image captured by the mounted display device 520 due to shaking.

Also, the display device 520 may output a graphic image related to the robot-based information collecting service.

Specifically, in an embodiment, the display device 520 may include a display communication processor, a display control processor, a display monitor, a display camera, and a display battery.

In more detail, the display communication processor may transmit/receive various data required for the robot-based information collecting service to/from an external computing device (in an embodiment, the field user terminal 1000 and/or the remote administrator terminal 2000, etc.).

Also, the display control processor may control each component of the display device 520 to provide the robot-based information collecting service.

In addition, the display monitor may display various data required for the robot-based information collecting service as a graphic image.

Such display monitors may include at least one of a touch screen, a liquid crystal display (LCD), a thin film transistor-liquid crystal display (TFT LCD), an organic light-emitting diode (OLED), a flexible display, a 3D display, and an e-ink display.

Also, the sensor unit 530 may acquire sensing data required for the robot-based information collecting service.

In an embodiment, the sensor unit 530 may include at least one sensor that rotates 360 degrees and senses an area around the robot 500.

In detail, in an embodiment, the sensor unit 530 may be implemented to include an image sensor, an object detection sensor, and an environment detection sensor.

Here, the image sensor may image an external object to acquire an image (or video) including a shape of the object.

Also, the image sensor may convert the acquired image into an electrical signal, process the image, and transmit the same to the display device 520 or the storage unit 570.

In an embodiment, such an image sensor may collect and provide images captured in real time at a predetermined worksite.

For example, the image sensor may be implemented as a Nexx 360 neckband type camera and may acquire and provide a 360-degree captured image based thereon.

Also, in an embodiment, the object detection sensor may detect a distance to a nearby object.

In an embodiment, the object detection sensor may include a LIDAR sensor (e.g., a VLP-16 sensor and/or a laser sensor) and/or a RADAR sensor.

At this time, the LIDAR sensor is a radar system that measures positional coordinates of a reflector by measuring a time for which a laser pulse is emitted and reflected back (time-of-flight methodology). For example, in the case of the VLP-16 sensor, location information thereof may be collected according to the radius r of the spherical coordinates, altitude ω, and azimuth angle α and provided.

In an embodiment, such a LIDAR sensor may scan a surrounding environment, while acquiring a point data set according to laser emission on a nearby object in real time.

Also, the RADAR sensor may sense distance information to a nearby object by emitting a radio frequency.

In addition, in an embodiment, the environment detection sensor may detect gas data, smoke data, heat data, and/or sound data in the surrounding environment.

In an embodiment, the environment detection sensor includes a gas sensor for sensing gas data of a surrounding environment, a heat (temperature) sensor for sensing heat data, and/or an image sensor for sensing smoke data and/or sound data, etc.

Meanwhile, the moving unit 540 of the robot 500 may cause the robot 500 to move in location under the control of the user or a processor.

In an embodiment, the moving unit 540 may include a wheel type structure moving device and/or a walking type structure moving device.

Here, the wheel type structure moving device may include at least two driving wheels (e.g., left/right driving wheels, etc.) for moving the robot 500, and the driving wheels may be disposed on at least a lower portion of the robot 500. In this case, the driving wheels may be configured to rotate by at least one or more motors each operated by a processor and allow the robot 500 to move while changing directions according to the driving of the motor.

In addition, the walking type structure moving device may include at least two or more leg type supports for movement of the robot 500 (e.g., left first and/or second leg type supports and right first and/or second leg type supports, etc.), and the leg type supports may allow the robot 500 to walk while changing directions by driving at least one or more motors that operate under the control of the processor.

In addition, the charging unit 550 may receive external power and/or internal power to supply power required for an operation to each component under the control of the processor.

For example, the charging unit 550 may include at least one of a power storage unit 570, a connection port, a power supply controller 580, and a charging monitoring unit.

Also, the communication unit 560 may include one or more devices (e.g., a communication processor, etc.) for communicating with other computing devices (e.g., the field user terminal 1000 and/or the remote administrator terminal 2000, etc.).

The communication unit 560 may transmit and receive wireless signals to and from at least one of a base station, an external terminal and/or a server on a mobile communication network established according to the technical standards or communication method for mobile communication (e.g., GSM (Global System for Mobile communication), CDMA (Code Division Multi Access), HSDPA (High Speed Downlink Packet Access), HSUPA (High Speed Uplink Packet Access), LTE (Long Term Evolution), LTE-A (Long Term Evolution-Advanced), etc.).

In addition, the storage unit 570 may store any one or more of an operating system (OS), various application programs, data, and commands for providing the robot-based information collecting service.

In an embodiment, the storage unit 570 may store and manage a robot-based information collecting program.

In this case, the storage unit 570 may include a program area and a data area.

Here, the program area according to an embodiment may be linked between an operating system (OS) for booting the robot 500 and functional elements, and the data area may store data generated according to the use of the robot 500.

Also, in some embodiments, software components stored in the storage unit 570 may include an operating system, a communication module (or a set of instructions), a contact/motion module (or a set of instructions), and a graphics module (or a set of instructions), a text input module (or set of instructions), a global positioning system (GPS) module (or set of instructions), and applications (or sets of instructions).

In addition, the storage unit 570 may be various storage devices such as ROM, RAM, EPROM, flash drive, hard drive, and the like, and may be a web storage performing a storage function of the storage unit 570 on the Internet.

Also, the storage unit 570 may be a recording medium in a form detachable from the robot 500.

In addition, the controller 580 may control an overall operation of each of the aforementioned units to implement the robot-based information collecting service.

The controller 580 may include at least one processor which may be a system-on-chip (SOC) suitable for the robot 500 including a central processing unit (CPU) and/or a graphic processing unit (GPU), execute an operating system (OS) and/or an application program stored in the storage unit 570, and may control each component mounted on the robot 500.

Also, the controller 580 may communicate with each component internally by a system bus, and may include one or more predetermined bus structures including a local bus.

In addition, the controller 580 may be implemented using at least one of ASICs (application specific integrated circuits), DSPs (digital signal processors), DSPDs (digital signal processing devices), PLDs (programmable logic devices), FPGAs (field programmable gate arrays), controllers, micro-controllers, microprocessors, and other electrical units for performing other functions.

Hereinafter, at least a portion of the functional operation performed by the robot 500 according to an embodiment of the present disclosure to provide the robot-based information collecting service may also be performed by the aforementioned computing device in various embodiments.

Method for Collecting Field Operation Situation and Facility Information

Hereinafter, a method for at least one processor (hereinafter, a processor) included in the controller 580 of the robot 500 according to an embodiment of the present disclosure to collect field operation situation and facility information through the robot 500 will be described in detail with reference to FIGS. 7 to 16.

Figure 7:
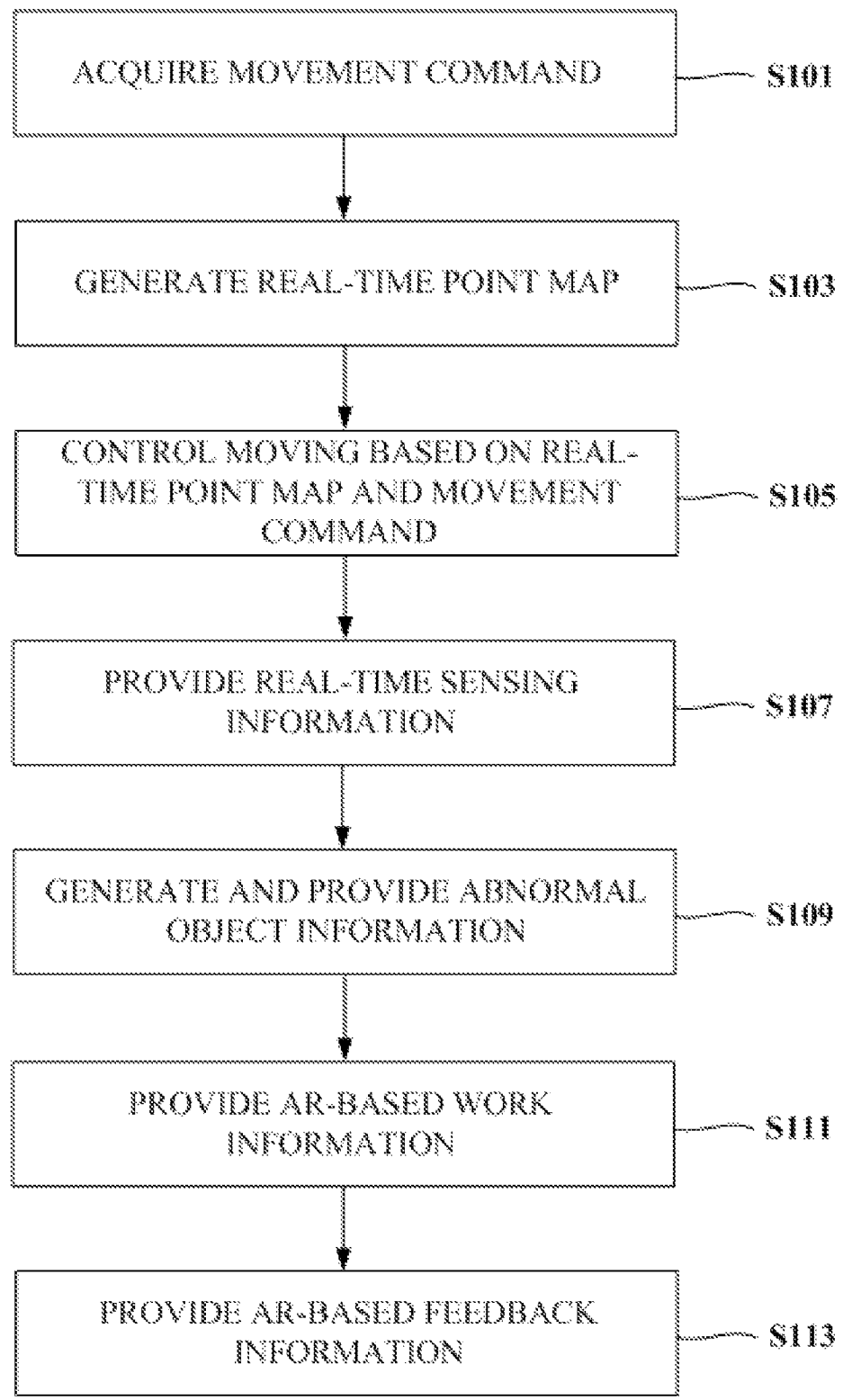
FIG. 7 is a flowchart illustrating a method for a remote collaboration based on a robot according to an embodiment of the present disclosure.

FIG. 7 is a flowchart illustrating a method for collecting field operation situation and facility information through the robot 500 according to an embodiment of the present disclosure.

Referring to FIG. 7, the processor according to an embodiment of the present disclosure may acquire a movement command (S101).

Here, the movement command according to an embodiment may be data for controlling the movement of the robot 500 and may include a patrol movement path or at least one target location based on a base map in an embodiment.

Here, the base map according to an embodiment may be map data for a target worksite (e.g., a hazardous work area, etc.) to be monitored. In an embodiment, the base map may be generated by combining at least one or more point maps for the entirety of the target worksite area.

Figure 8:
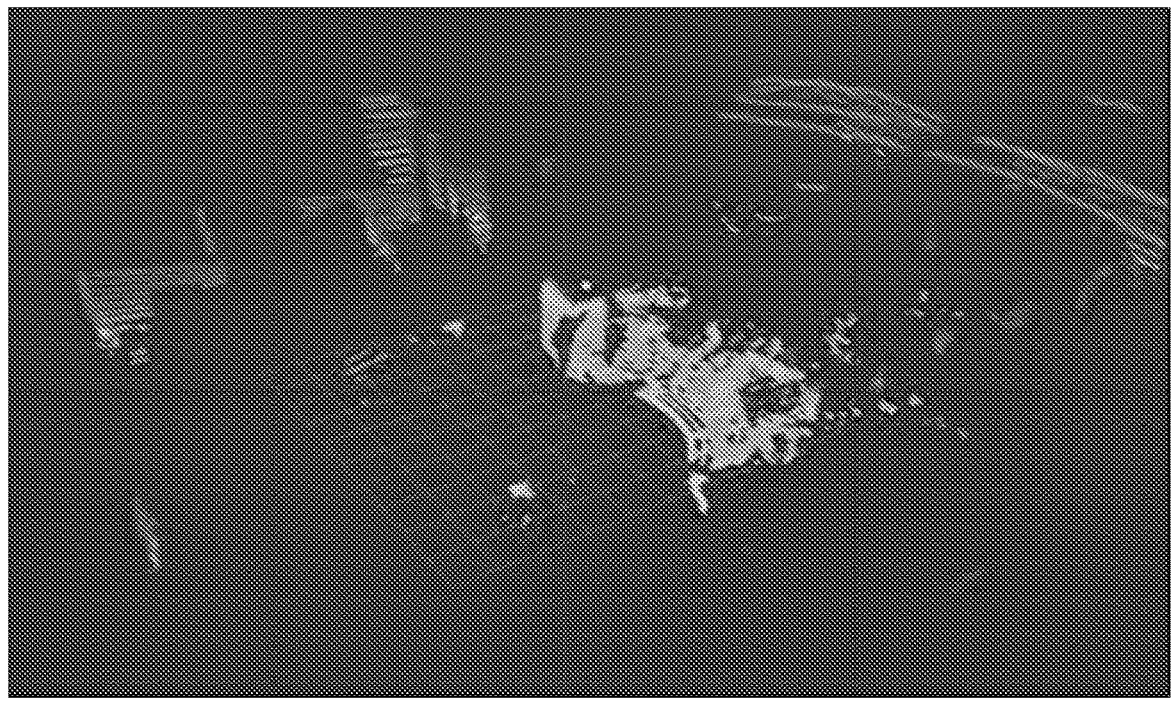
FIG. 8 is an example of a point map according to an embodiment of the present disclosure.

FIG. 8 is an example of a point map according to an embodiment of the present disclosure.

Here, referring to FIG. 8, the point map according to an embodiment may be point map data for a predetermined area (in an embodiment, the area around the robot 500) and may be point map data generated based on a set of points representing a 3D space using distance information to an object around the robot 500 in an embodiment.

In an embodiment, the point map may refer to point map data for a detecting area that the robot 500 may detect.

In detail, in an embodiment, the processor may acquire a base map for the target worksite area. Here, the base map may be acquired by the robot 500 generating point maps for the entire target worksite area and combining the generated point maps, and a pre-generated base map may be acquired from a database.

In more detail, the processor may interwork with the moving unit 540 to allow the robot 500 to move while patrolling the entire target worksite area.

In this case, the processor may generate a point map for each of at least one or more predetermined point areas in the target worksite in conjunction with the image sensor and/or object detection sensor of the sensor unit 530. A detailed description of how the processor generates the point map in an embodiment of the present disclosure follows the description of the processor in a real-time point map generating step S103, which will be described later.

Here, the point area may include a predetermined peripheral area formed based on the robot 500.

Also, in an embodiment, the processor may generate a base map for the target worksite area based on at least one or more point maps for the target worksite area generated as described above.

In detail, the processor may generate a base map for the target worksite area by matching the at least one point map based on a 3D spatial coordinate system preset with respect to the target worksite area.

In an embodiment of the present disclosure, it has been described that the processor patrols the target worksite, acquires a plurality of point maps for the corresponding target worksite area, and generates a base map based thereon, but this is only an example, and in the present disclosure, the method or algorithm for the processor to acquire the base map for the target worksite area is not limited.

In addition, the processor may transmit and provide the base map to the remote administrator terminal 2000 and/or the field user terminal 1000.

In the remote administrator terminal 2000, the base map may be displayed in the form of a point map or may be displayed through a digital twin model generated based on the base map.

Also, in an embodiment, the processor may acquire a patrol movement path and/or a target location based on the base map.

Figure 9:
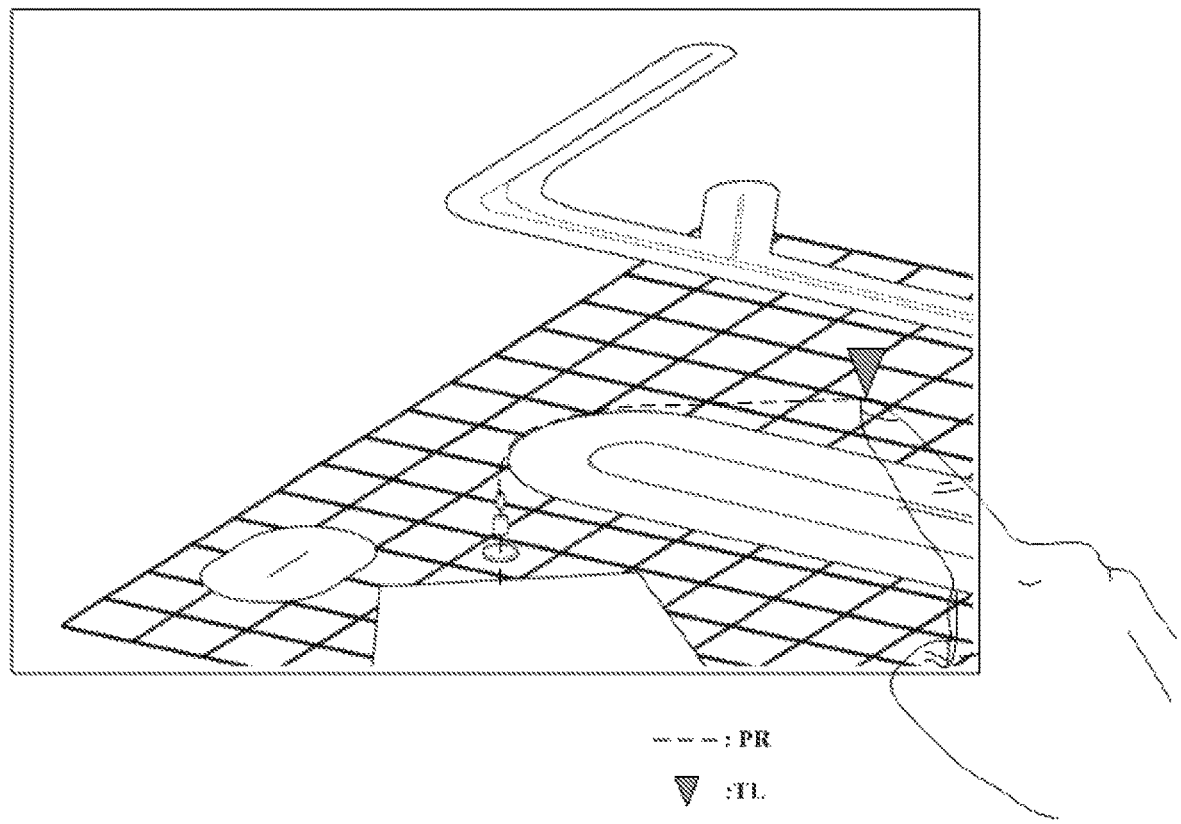
FIG. 9 is an example of a view illustrating a patrol movement path and a target location according to an embodiment of the present disclosure.

FIG. 9 is an example of a view illustrating a patrol movement path and a target location according to an embodiment of the present disclosure.

Referring to FIG. 9, the patrol movement path PR according to an embodiment may be information on an optimal movement path specialized for patrol for a target worksite area in advance. In an embodiment, the patrol movement path PR may include a point map for each of at least one movement path area including the optimal movement path.

In an embodiment, the patrol movement path PR may include an all-around movement path for movement paths passing through all movable areas included in the target worksite area, a core-shortest time movement path for a movement path passing through at least one or more core areas previously set as areas to be necessarily patrolled and/or a user-set movement path according to a user input.

In detail, in an embodiment, the processor may set an all-around movement path for patrolling the target worksite area based on the base map.

In more detail, the processor may determine a remaining area other than the area occupied by at least one object in the base map as a movable area.

Also, the processor may detect, as at least a portion of the movable area, an area necessary for patrolling the front, rear, left, and right areas for each of the at least one or more objects.

In addition, the processor may acquire an all-around movement path for patrolling the target worksite area by setting the detected necessary area as the movement path area.

Also, in an embodiment, the processor may extract and acquire a point map for each of at least one movement path area including the all-around movement path from the base map.

In addition, the processor may further include the acquired at least one point map for each movement path area in the set all-around movement path.

That is, in an embodiment, the all-around movement path may be a movement path for generating a point map for all areas of the base map during one patrol in the robot 500. However, an area occupied by an object disposed on the target worksite may be excluded.

Alternatively, in an embodiment, the all-around movement path may be a path in which a detection area of the robot 500 according to movement along the all-around movement path of the robot 500 covers all the areas of the base map.

Further, in an embodiment, the processor may set a core-shortest movement path and/or user-set movement path for patrolling the target worksite area based on an input of the user (in an embodiment, a remote administrator and/or field worker, etc.).

In detail, in an embodiment, the processor may provide a movement path setting interface in conjunction with a monitoring application of the computing device.

Also, the processor may set the core area and/or the user-set movement path area for the target worksite area based on the user input based on the provided movement path setting interface.

Also, the processor may determine a core-shortest movement path and/or a user-set movement path for patrolling the target worksite area based on the core area and/or the user-set movement path area set as described above.

In addition, the processor may extract and acquire a point map for each of at least one movement path area including the determined core-shortest movement path and/or user-set movement path from the base map.

For example, the processor may determine at least one or more patrol areas, and detect and generate the shortest movement path for generating a point map for the determined at least one or more patrol areas as the core-shortest movement path.

In addition, the processor may further include the acquired at least one point map for each movement path area in the set core-shortest time movement path and/or user-set movement path.

Meanwhile, referring further to FIG. 9, the target location TL according to an embodiment may be information on a predetermined point at which the robot 500 is to be located within the target worksite area. In an embodiment, the target location TL may include a point map (hereinafter, referred to as a target location point map) for a predetermined peripheral area including the corresponding target location TL.

In detail, in an embodiment, the processor may provide a target location setting interface in conjunction with the monitoring application of the computing device.

Also, the processor may set the target location TL for the target worksite area based on a user input based on the provided target location setting interface.

Also, the processor may extract and acquire a target location point map of the target location TL set as described above from the base map.

Also, the processor may further include the acquired target location point map in the set target location TL.

Thus, in an embodiment, the processor may obtain a movement command including the base map-based patrol movement path PR and/or the target location TL for controlling the movement of the robot 500 in the manner as described above.

Meanwhile, the processor may receive a real-time movement command and control the movement of the robot 500 according to the received movement command.

For example, the processor may receive a real-time movement command for movement direction, movement speed, rotational movement, etc. From the remote administrator terminal 2000 and control the moving unit 540 according to the received real-time movement command to move the robot 500 and generate a point map.

In addition, the processor may receive a real-time movement command for movement direction, movement speed, rotational movement, etc. From the field worker terminal 1000 and control the moving unit 540 according to the received real-time movement command to move the robot 500 and generate a point map.

Also, in an embodiment, the processor may generate a real-time point map for a detection area around the current robot 500 (S103).

Referring further to FIG. 8, in other words, the point map is point map data for a predetermined area (in an embodiment, an area around the robot 500), and may be point map data generated based on a set of points representing a 3D space using distance information to an object around the robot 500 in an embodiment.

In detail, in an embodiment, the processor may generate a real-time point map by using depth data with a nearby object acquired based on the image sensor and/or object detection sensor of the sensor unit 530.

In more detail, the processor may generate a point map for a predetermined peripheral area (hereinafter, a current reference area) detectable to be formed based on a current location (i.e., current location of the robot 500) based on the image sensor and/or the object detection sensor of the sensor unit 530.

Specifically, in an embodiment, the processor may acquire a field image obtained by imaging at least a portion of the current reference area in real time based on the image sensor. For example, the processor may acquire a moving direction-side field image detected by the image sensor of the sensor unit 530.

In addition, in an embodiment, the processor may acquire depth data including real-time distance information to at least one nearby object in the current reference area based on the object detection sensor (in an embodiment, a LIDAR sensor (e.g., a VLP-16 sensor and/or a laser sensor, etc.) and/or a RADAR sensor, etc.).

In this case, the depth data according to an embodiment may further include a point data set according to distance information to the nearby object.

For example, the processor may acquire the depth data based on a time-of-flight methodology using Velodyne LIDAR sensors, that is, a method for calculating a distance by measuring a time for which light is reflected, and scan the surrounding environment while acquiring a point data set according to the emission of the light in real time.

In this case, according to an embodiment, the processor may provide a phase-locked multi-sensor support process for controlling an area where laser emission overlaps in order to minimize interference between sensors.

Also, in an embodiment, the processor may generate a point map for the current reference area based on the acquired field image and/or depth data as described above.

Also, in an embodiment, the processor may perform moving control based on the real-time point map and a movement command (S105).

In detail, in an embodiment, the processor may control the movement of the robot 500 based on the movement command acquired as described above and the generated real-time point map.

In more detail, in an embodiment, the processor may map the real-time point map to at least a partial area of the aforementioned base map. That is, the processor may map the real-time point map and a point map of at least a partial area of the base map corresponding to the real-time point map to each other.

In addition, in an embodiment, the processor may control the robot 500 to move according to the movement command based on the mapped real-time point map.

In detail, the processor may control 1) the movement of the robot 500 based on the patrol movement path PR of the movement command.

In more detail, the processor may extract at least one or more point maps (hereinafter, patrol point maps) for the patrol movement path PR.

Also, the processor may determine whether at least a portion of the extracted patrol point map and the real-time point map match (mapped or not).

In this case, in an embodiment, when there is no area (hereinafter, referred to as a mapping area) in which at least a portion of the patrol point map and the real-time point map match, the processor may perform movement to change the current location of the robot 500 using the moving unit 540.

In addition, the processor may repeat the process of generating the real-time point map based on the current reference area based on the changed current location and determining whether the generated real-time point map and at least a portion of the patrol point map match.

Meanwhile, in an embodiment, when a mapping area between at least a portion of the patrol point map and the real-time point map exists, the processor may interwork with the moving unit 540 to change the current location along the mapping area.

That is, the processor may detect the real-time point map having an area matching the patrol point map indicating the aforementioned patrol movement path PR and control the robot 500 to move along the detected real-time point map as described above, so that the robot 500 may move the corresponding target worksite area according to the patrol movement path PR.

Accordingly, the processor may cause the robot 500 to autonomously drive based on an optimal movement path specialized for patrol for the target worksite area.

In this case, in an embodiment, when an obstacle object on the corresponding movement path is detected when moving along the patrol movement path PR, the processor may generate a bypass movement path avoiding the detected obstacle object. In this case, the bypass movement path may include a point map for each of at least one or more movement path areas including the corresponding bypass movement path.

In an embodiment, the processor may generate the above bypass movement path by utilizing at least a portion of a known autonomous driving obstacle recognition algorithm, and in an embodiment of the present disclosure, the algorithm itself is not limited.

In addition, in an embodiment, the processor may cause the robot 500 to move along the bypass movement path generated as described above.

Accordingly, the processor may allow the robot 500 to more safely move by avoiding an obstacle object in the corresponding target worksite area based on a predetermined autonomous driving obstacle recognition algorithm.

Meanwhile, in an embodiment, the processor may control 2) the movement of the robot 500 based on at least one target location TL of the movement command.

In detail, the processor may map a target location point map matching the target location TL to a point map (hereinafter referred to as a target point map) for a predetermined peripheral area including a target point that is a point corresponding to the target location TL on the aforementioned base map.

Here, the target point map according to an embodiment may be at least a portion of at least one or more point maps (hereinafter, referred to as a base point map) for the entire target worksite area indicated by the aforementioned base map.

Also, in an embodiment, the processor may generate a target location (TL)-based movement path, which is an optimal movement path for moving from the current location to the target point, based on the base map. In this case, in an embodiment, the target location (TL)-based movement path may include a point map (hereinafter, a target location point map) for each of at least one movement path area including the optimal movement path.

In addition, if there is no mapping area in which at least a portion of the target location point map and the real-time point map match, the processor may perform a movement to change the current location of the robot 500 using the moving unit 540.

In addition, the processor may repeat the process of generating the real-time point map based on the current reference area based on the changed current location and determining whether the generated real-time point map and at least a portion of the target location point map match.

Meanwhile, in an embodiment, when a mapping area between at least a portion of the target location point map and the real-time point map exists, the processor may perform movement to change the current location along the mapping area.

That is, the processor may detect a real-time point map having an area matching the target location point map indicating the target location (TL)-based movement path described above and control the robot 500 to move according to the real-time point map detected as described above, so that the robot 500 may autonomously move to the preset target location TL in the corresponding target worksite area.

In this case, in an embodiment, when an obstacle object on the corresponding movement path is detected while the robot 500 moves along the patrol movement path PR, the processor may generate a bypass movement path avoiding the detected obstacle object and allow the robot 500 to be moved along the generated bypass movement path. A detailed description thereof will be replaced with the description of the bypass movement path described above.

Meanwhile, according to an embodiment, the processor may control the robot 500 to move according to a real-time input of the user (in an embodiment, the remote administrator and/or the field user, etc.).

Figure 10:
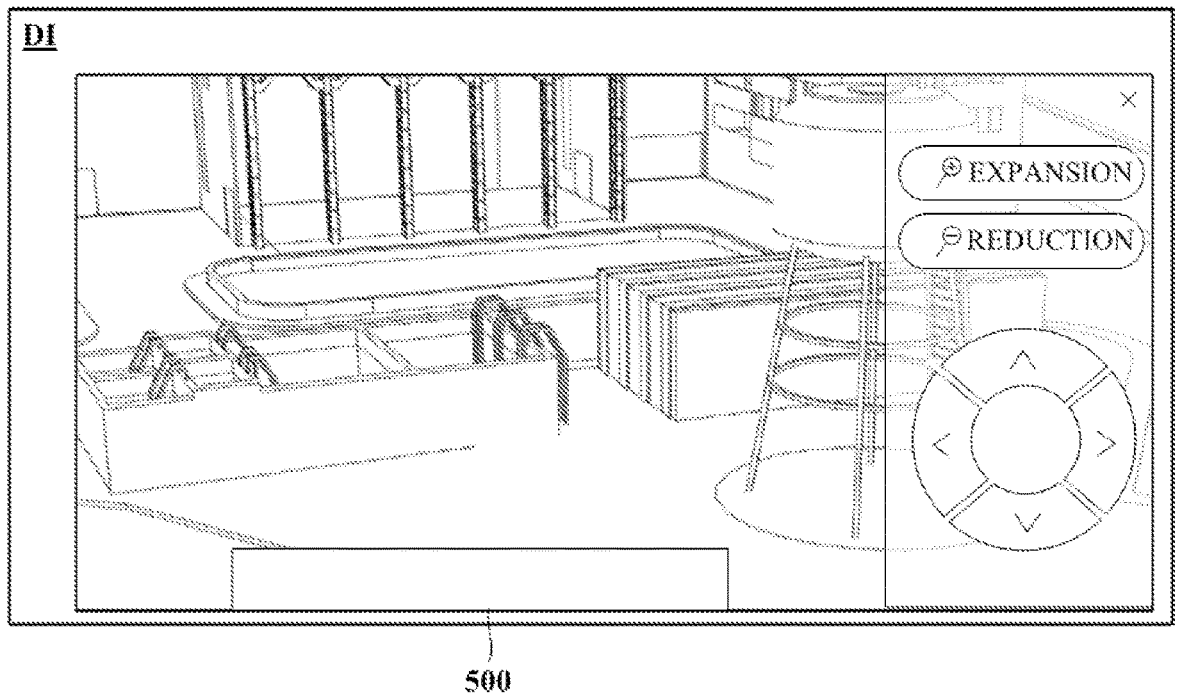
FIG. 10 is an example of a user interface for controlling a movement direction of a robot according to an embodiment of the present disclosure.

FIG. 10 is an example of a user interface for controlling a movement direction of the robot 500 according to an embodiment of the present disclosure.

In detail, referring to FIG. 10, in an embodiment, the processor may provide a real-time movement direction input interface DI of the robot 500 in conjunction with the monitoring application of the computing device.

Here, the real-time movement direction input interface DI may be a user interface for acquiring a user input for controlling a real-time movement direction of the robot 500.

In addition, the processor may control the moving unit 540 based on a user input (e.g., forward, backward, leftward or rightward movement input, etc.) based on the provided real-time movement direction input interface DI to cause the robot 500 to move according to the user input.

Accordingly, the processor may perform movement according to an input of a real-time user (in an embodiment, the remote administrator and/or the field worker, etc.) in addition to a preset movement command.

As described above, in an embodiment, the processor may control the movement of the robot 500 in an area (e.g., a worksite area that is risky for a person to enter) to be monitored by utilizing simultaneous localization and mapping (SLAM) technology, autonomous driving obstacle recognition technology and/or remote control technology, etc., and through this, the processor may perform a robot-based patrol, that is, a patrol process for the corresponding target worksite area.

Also, in an embodiment, the processor may provide real-time sensing information (S107).

In detail, in an embodiment, when a patrol mode is activated, the processor may obtain and provide real-time sensing information while moving.

Here, the patrol mode according to an embodiment may be a mode for implementing a patrol function for a target worksite area to be monitored, and in an embodiment, the patrol mode may be a mode implementing a functional operation of acquiring and providing real-time sensing information including real-time current location information, real-time filed image and/or real-time environment detection information, etc. For the related area, while moving around the target worksite area in an embodiment.

Figure 11:
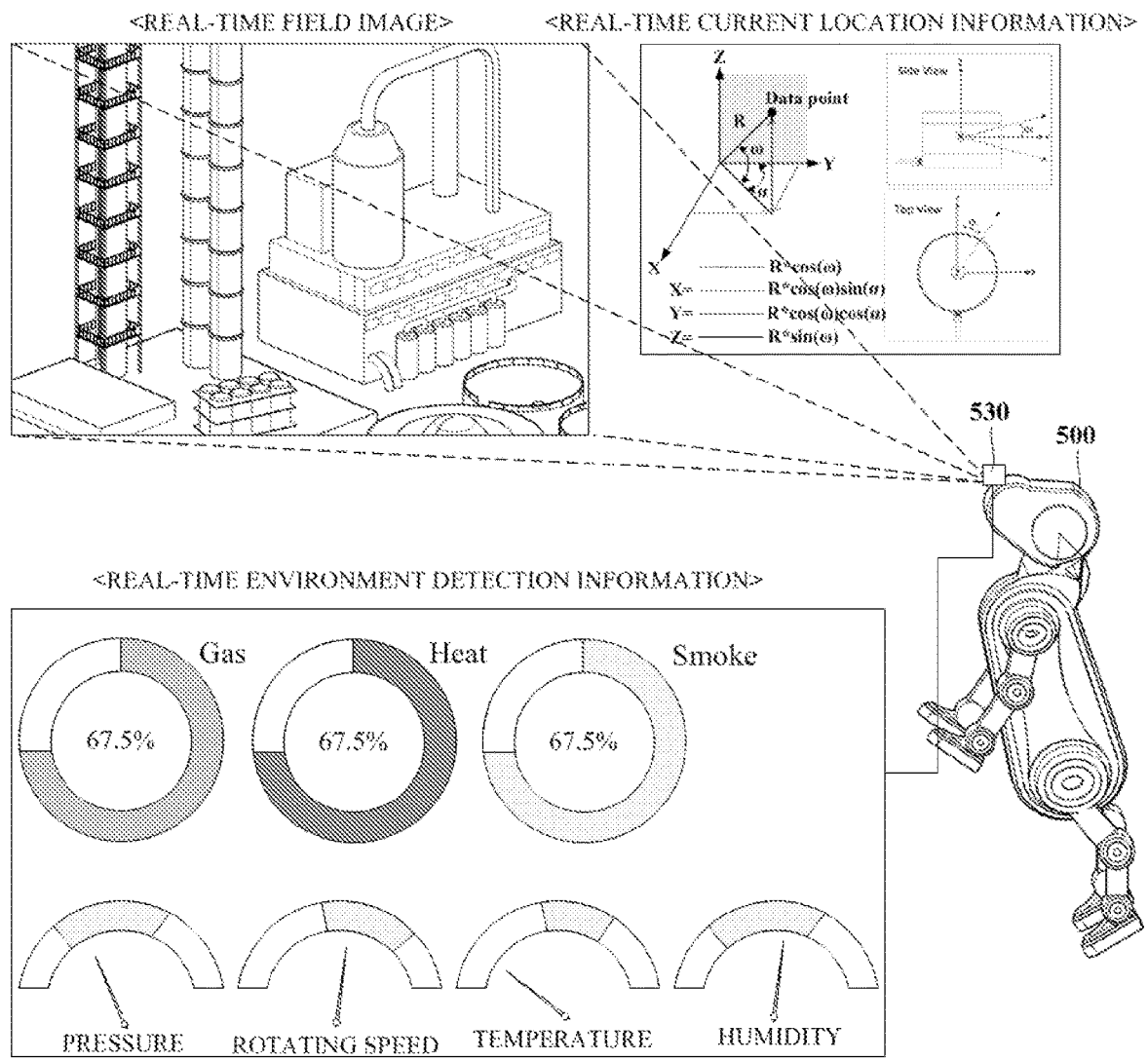
FIG. 11 is a conceptual diagram illustrating a configuration for providing real-time sensing information using a robot according to an embodiment of the present disclosure.

FIG. 11 is a conceptual diagram illustrating a configuration for providing real-time sensing information using THE robot 500 according to an embodiment of the present disclosure.

In more detail, referring to FIG. 11, in an embodiment, the processor may acquire the real-time sensing information based on the sensor unit 530 when the patrol mode is activated.

Specifically, in an embodiment, the processor may acquire 1) real-time current location information.

In detail, the processor may provide real-time current location information of the robot 500 based on the base map and the real-time point map.

In more detail, the processor may map the real-time point map and the base map to track the real-time current location information.

In an embodiment, the processor may map the real-time point map to at least a portion of the base point map based on predetermined first point group information (that is, a set of points detected based on the object detection sensor in an embodiment) included in the real-time point map and a predetermined second point group information included in the base point map, which is at least one or more point maps for the base map.

Specifically, the processor may determine points within a preset radius in the real-time point map as the first point group information.

Also, among the point groups based on a preset radius of the base map, a point group having a point ratio matching the points of the first point group is equal to or greater than a predetermined percentage may be detected as the second point group.

That is, the processor may compare the first point group information with the second point group information of the base point map and detect second point group information having point group information mutually matching the first point group information by a matching rate equal to or greater than a preset ratio.

In this case, in an embodiment, the processor may acquire 3D location information of the base point map (hereinafter, referred to as a mapping point map) mapped to the real-time point map.

In detail, the processor may acquire 3D location information for the mapping point map based on a 3D spatial coordinate system previously set with respect to the base map.

In addition, the processor may acquire current 3D location information (i.e., the real-time current location information in an embodiment) for the real-time point map mapped to the mapping point map, based on the acquired 3D location information.

Since the 3D location information includes the real-time location of the robot 500 in the target worksite area and information indicating a monitoring area of the robot 500 in the real-time location, the remote administrator terminal 2000 and the field worker terminal 1000 that have transmitted the information may recognize the real-time location and monitoring area of the robot 500 through the 3D location information.

In this case, according to an embodiment, when AR remote collaboration is required in the area indicated by the real-time current location information, the processor may perform the AR remote collaboration process in conjunction with the monitoring application of the computing device. Details thereof will be described in the step S111 of providing AR-based work information to be described later.

That is, the processor tracks and provides the real-time location of the robot 500 performing patrol on the target worksite area, thereby improving the quality of monitoring for the target worksite area and improve performance of the remote collaboration service based on the information acquired through the monitoring.

Also, in an embodiment, the processor may acquire 2) a real-time field image.

In detail, in an embodiment, the processor may provide a captured peripheral image, i.e., a real-time field image, obtained by imaging the current reference area in real time in conjunction with the image sensor.

In an embodiment, the processor may acquire a real-time 360-degree field image (e.g., a 360-degree captured image based on a Nexx 360 neckband camera) for the current reference area.

Through this, the processor may enable the user to realistically monitor the real-time situation of the corresponding worksite without being directly located at a specific worksite, such as a hazardous area.

In addition, in an embodiment, the processor may acquire 3) real-time environment detection information.

Here, the environmental detection information according to an embodiment may be information including gas, smoke, and heat for the surrounding environment detected using a predetermined sensor (in an embodiment, the environment detection sensor and/or image sensor of the sensor unit 530) and/or sound data.

In detail, the processor may acquire real-time environment detection information for the current reference area by interworking with an environment detection sensor (in an embodiment, a gas sensor and/or a heat (temperature) sensor, etc.) and/or an image sensor of the sensor unit 530.

In an embodiment, the processor may acquire real-time gas data (e.g., whether gas occurs and/or whether a gas reference value is exceeded, etc.) for a corresponding current reference area by using the gas sensor of the environment detection sensor. In addition, the processor may acquire real-time heat (temperature) data (e.g., measured temperature, whether or not a temperature reference value is exceeded, etc.) for the current reference area by using a heat (temperature) sensor of the environment detection sensor. In addition, the processor may acquire real-time smoke data (e.g., whether smoke occurs and/or whether a smoke reference value is exceeded, etc.) and/or sound data (e.g., whether a specific sound occurs, etc.) for the current reference area using the image sensor using the image sensor.

Accordingly, the processor may easily and intuitively recognize environmental information (e.g., gas, smoke, heat (temperature) and/or sound data, etc.) that should be paid attention to at the worksite.

In addition, in an embodiment, the processor may generate real-time sensing information for the current reference area based on the real-time current location information, real-time field image, and/or real-time environment detection information acquired as described above.

Also, the processor may transmit and provide the generated real-time sensing information to the remote administrator terminal 2000 and/or the field user terminal 1000.

That is, the processor visualizes and provides the real-time sensing information to the remote administrator terminal 2000 and/or the field user terminal 1000 so that the remote administrator and/or field user may share the real-time sensing information.

In addition, in an embodiment, the processor may generate and provide abnormal object information (S109).

Figure 12:
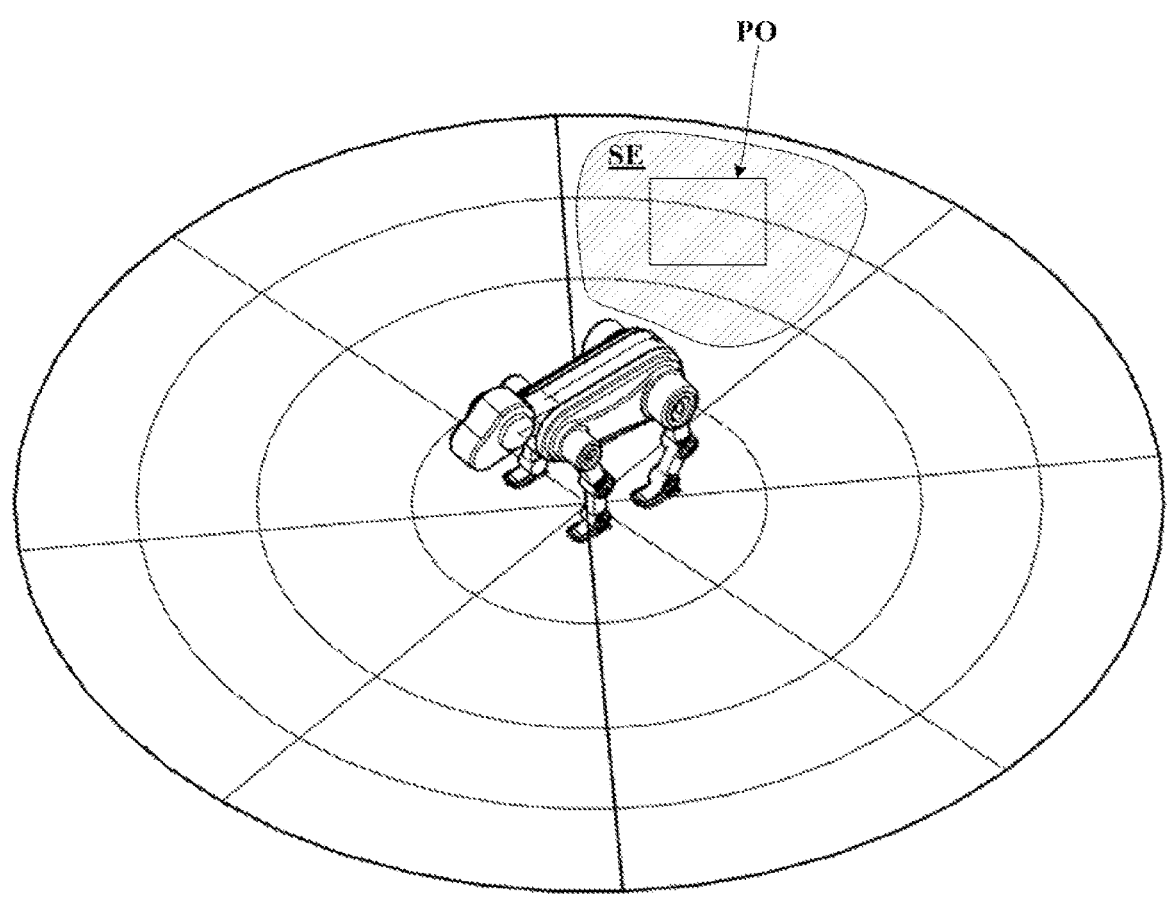
FIG. 12 is an example of a diagram illustrating a method for providing abnormal object information according to an embodiment of the present disclosure.

FIG. 12 is an example of a diagram illustrating a method for providing abnormal object information according to an embodiment of the present disclosure.

In detail, referring to FIG. 12, in an embodiment, when a preset specific environment SE is detected, the processor may generate abnormal object information on an abnormal object PO which is a predetermined object located in the detected specific environment SE.

Here, the abnormal object information according to an embodiment may be information including location information and/or related specific environment information on the abnormal object PO, which is an object located in a preset specific environment SE.

In more detail, in an embodiment, the processor may provide a user interface for setting the specific environment SE by interworking with the monitoring application of the computing device.

Also, in an embodiment, the processor may previously set the specific environment SE based on an input to the provided user interface.

Here, the specific environment SE according to an embodiment may be information including a condition for generating the abnormal object information, and include risky gas numerical data, risky smoke numerical data, risky temperature numerical data and/or risky sound data, etc.

In addition, in an embodiment, the processor performs movement of the robot 500 according to the aforementioned movement control and when the preset specific environment SE is sensed while collecting the real-time sensing information, the processor may generate and provide abnormal object information on the corresponding specific environment SE.

In an embodiment, the processor may determine whether the specific environment SE is satisfied for the corresponding current reference area using real-time sensing information acquired based on the aforementioned environment detection sensor and/or image sensor.

In addition, when it is determined that the specific environment SE is satisfied, the processor may generate related specific environment information indicating a specific environment SE related to the abnormal object PO located in the current reference area satisfying the specific environment SE.

In an embodiment, the processor may determine whether the corresponding current reference area satisfies the predetermined specific environment SE (here, a situation where gas exceeds a risky numeral value, etc.) based on the gas data acquired through the gas sensor and the risky gas numeral value data of the preset specific environment SE. In addition, the processor may determine whether the corresponding current reference area satisfies the predetermined specific environment SE (here, a situation in which the temperature exceeds a risky value, etc.) based on the heat (temperature) data acquired through the heat (temperature) sensor and the risky temperature value data of the preset specific environment (SE). In addition, the processor may determine whether the corresponding current reference area satisfies the predetermined specific environment SE (here, a situation in which the temperature exceeds a risky value and/or a situation in which a sound indicating a risky situation is sensed).

Based on the smoke data and/or sound data acquired through the image sensor, and the risky temperature value data and/or the risky sound data of the preset specific environment (SE), the current reference area is a predetermined It may be determined whether the specific environment SE (herein, a situation in which the temperature exceeds a risky value and/or a situation in which a sound indicating a risky situation is detected) is satisfied based on the smoke data and/or sound data acquired through the image sensor and the risky temperature value data and/or risky sound data of the preset specific environment SE.

In addition, when it is determined that the current reference area satisfies at least a portion of the specific environment SE based on the result of the determination performed as described above, the processor may generate related specific environment information indicating the specific environment SE, that is, whether the abnormal object PO located in the current reference area relates to a certain specific environment SE.

In addition, in an embodiment, when it is determined that the corresponding current reference area satisfies the specific environment SE, the processor may acquire location information of the abnormal object PO indicating the location of the abnormal object PO.

In detail, in an embodiment, when it is determined that the corresponding current reference area satisfies the specific environment SE, the processor may detect the abnormal object PO located in the specific environment SE, that is, located in the current reference area.

In an embodiment, the processor may detect the abnormal object PO located on the specific environment SE by using the sensor unit 530.

In addition, in an embodiment, the processor may acquire location information of the abnormal object PO indicating the location of the detected abnormal object PO.

In detail, the processor may acquire the location information of the abnormal object PO based on a point map (hereinafter, referred to as an abnormal object (PO) point map) including the abnormal object PO and the aforementioned base map.

In more detail, the processor may map the abnormal object (PO) point map and the base map to track the abnormal object (PO) location information.

In an embodiment, the processor may map the abnormal object PO point map to at least a portion of the base point map based on predetermined first point group information included in the abnormal object PO point map and predetermined second point group information included in the base point map which is at least one or more point maps for the base map.

Specifically, the processor may detect third point group information having point group information that is mutually consistent with the first point group information by comparing the first point group information of the anomaly object (PO) point map with the second point group information of the base point map. Also, the processor may map at least a portion of the base point map matching the detected third point group information and the abnormal object (PO) point map.

In this case, in an embodiment, the processor may obtain 3D location information of a mapping point map that is the base point map mapped to the abnormal object (PO) point map.

In detail, the processor may acquire 3D location information for the mapping point map based on a 3D spatial coordinate system previously set for the base map.

In addition, the processor may acquire current 3D location information (i.e., the abnormal object (PO) location information in an embodiment) for the abnormal object (PO) point map mapped to the mapping point map, based on the acquired 3D location information.

In addition, in an embodiment, the processor may generate the abnormal object information based on the obtained abnormal object (PO) location information and the related specific environment information.

In addition, in an embodiment, the processor may provide the generated abnormal object information to the remote administrator terminal 2000 and/or the field user terminal 1000 based on the field image obtained by imaging the current reference area in which the specific environment SE is detected.

In detail, the processor may display virtual content augmented with the abnormal object information on the field image obtained by imaging the current reference area in which the specific environment SE is detected based on the image sensor and provide the virtual content to the remote administrator terminal 2000 and/or the field user terminal 1000.

In this case, in an embodiment, the processor may determine and display a location to augment the virtual content based on the abnormal object PO location information of the predetermined abnormal object PO in the field image.

Accordingly, the processor may generate and provide collective information including location, a related object, and/or a cause of the occurrence of an abnormal situation for an area in which an abnormal situation is detected in the target worksite area in a form that the user (in an embodiment, a remote administrator and/or a field worker) may intuitively recognize it.

In addition, in an embodiment, the processor may provide AR-based work information (S111).

Figure 13:
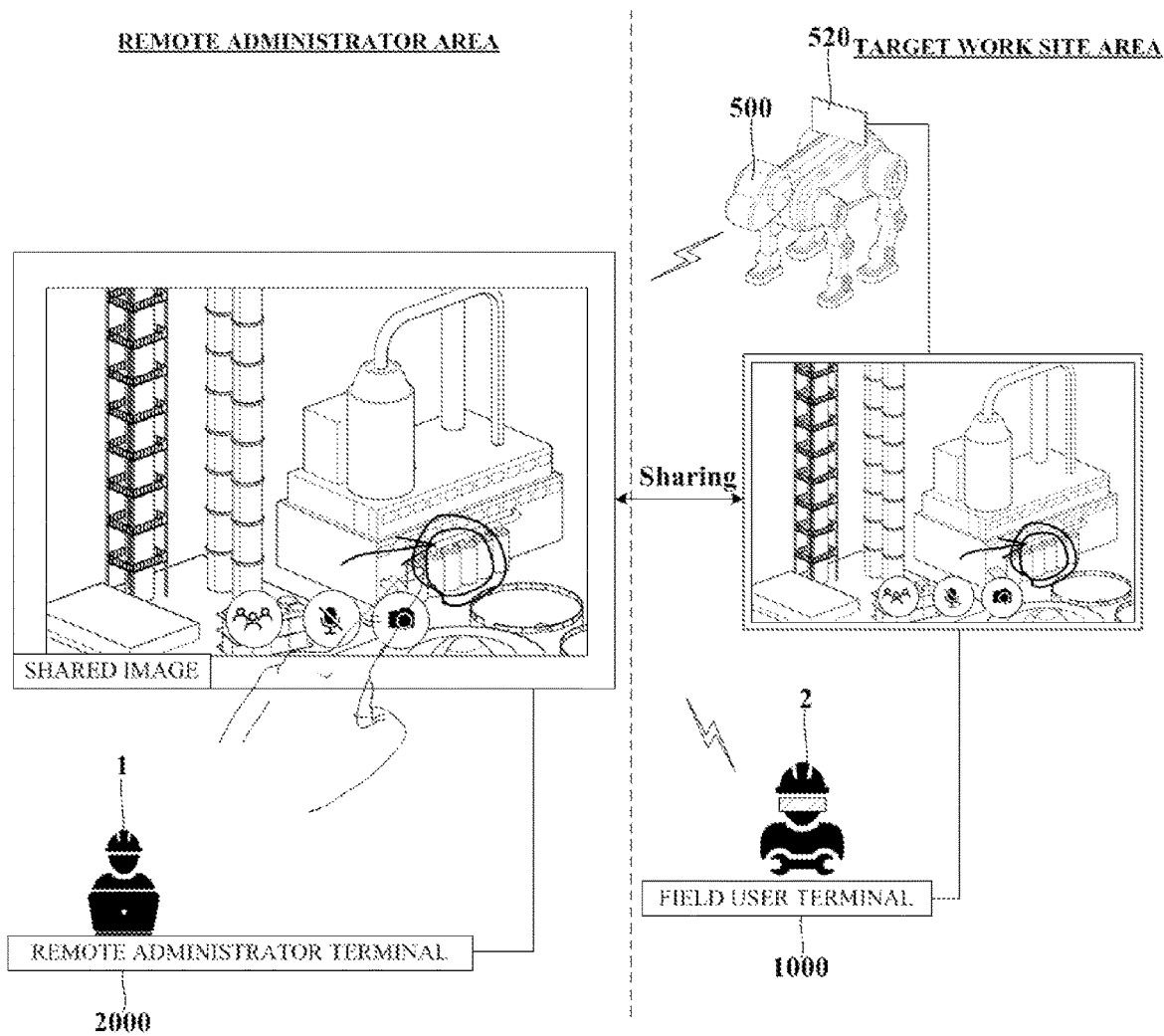
FIG. 13 is a conceptual diagram illustrating a method for providing augmented reality-based work information according to an embodiment of the present disclosure.

FIG. 13 is a conceptual diagram illustrating a method for providing AR-based work information according to an embodiment of the present disclosure.

Referring to FIG. 13, the AR-based work information according to an embodiment may include virtual content providing work guidance instructing or assisting work of the field worker 2 by the remote administrator 1 located remotely from the worksite. At this time, the remote administrator 1 according to an embodiment may be a perform who provides work guidance instructing or assisting work of the field worker 2 located in the worksite at a location remote from the worksite as virtual content.

In an embodiment, such AR-based work information may include virtual content providing work guidance based on text, pointing, image, drawing and/or voice data based on input of the remote administrator 1 using the remote administrator terminal 2000.

In detail, in an embodiment, the processor may acquire AR-based work information by an input of the remote administrator 1 by interworking with the remote administrator terminal 2000. That is, the processor may acquire virtual content that provides work guidance including text, pointing, image, drawing and/or voice data input by the remote administrator 1 from the remote administrator terminal 2000 to instruct or assist the work of the field worker 2.

In addition, in an embodiment, the processor may provide 1) AR-based work information based on an image captured by using a predetermined image sensor.

In more detail, the processor may display the acquired AR-based work information on a captured image acquired through a predetermined image sensor.

In this case, the image sensor according to an embodiment may include an image sensor of the robot 500 (hereinafter, a first image sensor), a display camera (hereinafter, a second image sensor) of a display device 520, an image sensor (hereinafter, a third image sensor) of the field user terminal 1000, and/or a field image sensor (hereinafter, a fourth image sensor) installed at a predetermined location in a target worksite area.

That is, in an embodiment, the processor may display the AR-based work information on the captured image acquired through the first to fourth image sensors.

Specifically, the processor may display and provide the AR-based work information on a field image based on the first image sensor. Also, the processor may display and provide the AR-based work information on a sub-field image based on the second image sensor. In addition, the processor may display and provide the AR-based work information on a user image based on the third image sensor. In addition, the processor may display the AR-based work information on a field camera image (e.g., CCTV image, etc.) based on a fourth image sensor.

In this case, in an embodiment, the remote administrator terminal 2000 may acquire AR-based work information according to an input from the remote administrator 1 based on at least one of the field image based on the first image sensor of the robot 500, the sub-field image based on the second image sensor of the display device 520, the user image based on the third image sensor of the field user terminal 1000 and/or the field camera image based on the field image sensor, and may share an image in which the acquired AR-based work information is displayed with the processor.

In addition, in an embodiment, the processor may output and provide a predetermined captured image (in an embodiment, a field image, a sub-field image, the user image and/or the field camera image, etc.) displaying the AR-based work information as described above by interworking with at least one of the display device 520, the remote administrator terminal 2000 and/or the field user terminal 1000.

Accordingly, the processor may provide augmented display of AR-based work information related to a corresponding area as virtual content on the image of a area of the worksite.

In this case, according to an embodiment, the processor may acquire AR-based work information for a point or object other than the captured image from the remote administrator terminal 2000.

In detail, the processor may receive external AR-based work information that provides work guidance for a predetermined point or object included in a second area other than a predetermined first area included in the captured image from the remote administrator terminal 2000.

In addition, the processor may augmentedly display predetermined virtual content indicating a predetermined point or a location of an object corresponding to the external AR-based work information based on the captured image (in the embodiment, a field image, a sub-field image, a user image and/or a field camera image, etc.).

Specifically, the processor may augmentedly display, as the virtual content. a navigation image guiding a movement direction of the robot 500 for capturing a predetermined point or a location of an object corresponding to the external AR-based work information on the captured image using at least one of the predetermined sensors.

In addition, the processor may output and provide a predetermined captured image (in the embodiment, field image, sub-field image, user image and/or field camera image, etc.) displaying the external AR-based work information by interworking with at least one of the display device 520, the remote administrator terminal 2000 and/or the field user terminal 1000.

Therefore, when it is necessary to check the AR-based work information for another area other than the area that may be confirmed in the captured image, the processor may display and provide predetermined virtual content guiding to a specific point or object matched to the AR-based work information (in the embodiment, external AR-based work information) for the other area on the captured image.

Meanwhile, according to an embodiment, the processor may adjust a display position of AR-based work information augmented and displayed on the captured image.

In detail, the processor may adjust the display position of the AR-based work information according to a change in the area of the captured image, that is, in a position of an object and/or a predetermined point in the captured image, as the robot 500 moves.

In more detail, the processor may receive, from the remote administrator terminal 2000, AR-based work information for a past captured image taken at a location before the robot 500 moves.

In addition, the processor may determine a predetermined first position to augment and display the received AR-based work information on the past captured image.

In addition, the processor may compare the current captured image and the past captured image taken after the robot 500 moves, that is, at the current location of the robot 500.

In addition, the processor may determine a predetermined second position in the current captured image corresponding to a predetermined first position for displaying the AR-based work information on the past captured image through the comparison.

For example, when the AR-based work information is displayed on a first position where the first object is located in the past captured image, the processor may determine to display the AR-based work information at the second position where the first object is located in the current captured image by comparing the past captured image with the current captured image.

Accordingly, the processor may determine the augmented display position of the AR-based work information according to the positional movement of the robot 500 through comparison between the past captured image and the current captured image. In addition, even if a predetermined delay occurs in the process of receiving the AR-based work information for the captured image from the remote administrator terminal 2000 (that is, when the robot 500 moves while a predetermined delay occurs in the process of receiving the AR-based work information based on the captured image, etc.), the AR-based work information may be augmentedly displayed in an appropriate position on the captured image in synchronization with the AR-based work information.

In addition, according to an embodiment, the processor may provide 2) AR-based work information based on the base map.

In detail, the processor may acquire work information providing target point setting information (hereinafter, target point setting information) of the remote administrator 1 based on the base map by interworking with the remote administrator terminal 2000.

Here, the target point setting information according to an embodiment may include location information on a specific point or a specific object on the base map selected by the remote administrator 1 based on the base map output to the remote administrator terminal 2000.

In more detail, in an embodiment, the remote administrator terminal 2000 may acquire an input of the remote administrator 1 for selecting a specific point or a specific object on the base map, and generate and provide the target point setting information based on the acquired input and provides the generated target point setting information to the processor.

Subsequently, the processor acquiring the target point setting information may acquire a captured image based on the acquired target point setting information.

Figure 14:
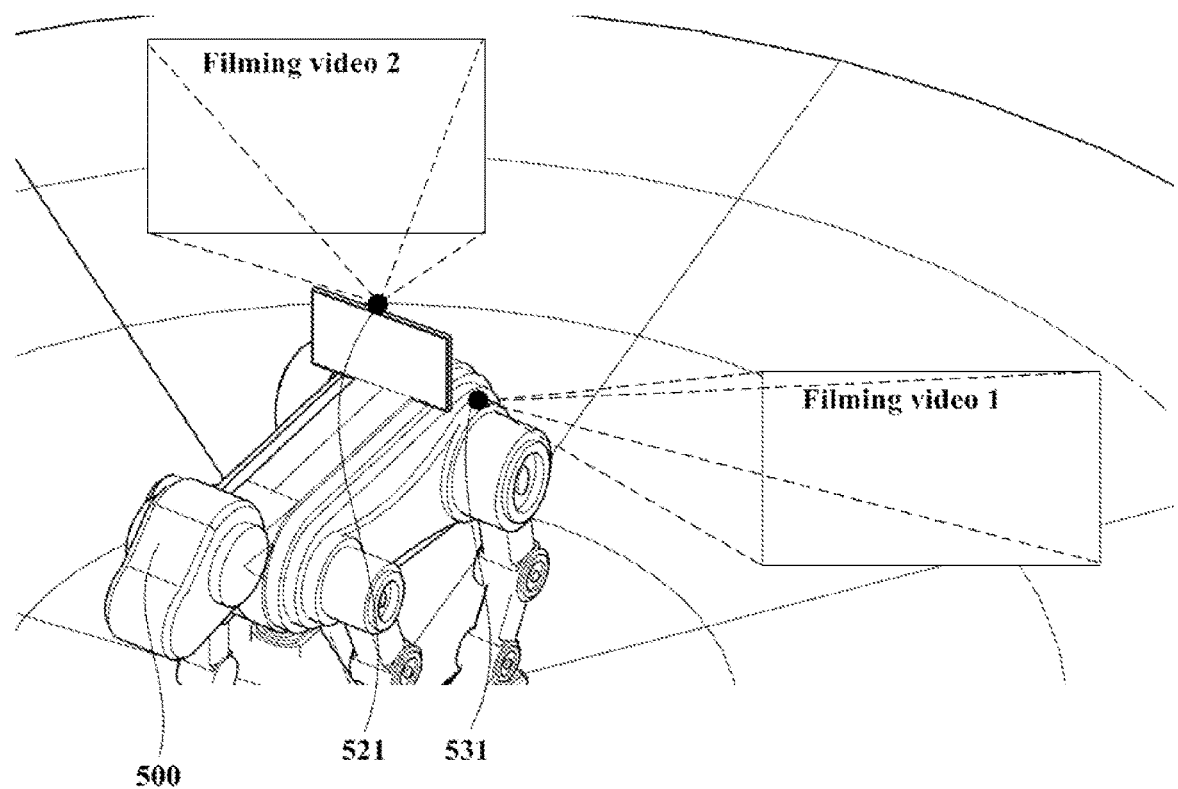
FIG. 14 is an example of a diagram illustrating a method for a robot to acquire a captured image using different sensors according to an embodiment of the present disclosure.

FIG. 14 is an example of a diagram illustrating a method in which the robot 500 acquires a captured image using different sensors according to an embodiment of the present disclosure.

In this case, referring to FIG. 14, in an embodiment, the processor may acquire 1) a first captured image (i.e., a field image) according to the target point setting information based on the first image sensor 531.

In more detail, the processor may move the robot 500 based on the acquired target point setting information.

Specifically, the processor may interwork with the moving unit 540 to move the robot 500 to a specific point on the base map included in the target point setting information or a target location indicated by location information (hereinafter, target location information) for a specific object. That is, the processor may move the robot 500 so that the target location becomes the current location of the robot 500.

Also, the processor may acquire a field image obtained by imaging a predetermined peripheral area (i.e., a current reference area in an embodiment) formed based on the target location as a current location using the first image sensor 531.

Meanwhile, referring further to FIG. 14, in another embodiment, the processor may acquire a second captured image (i.e., a sub-field image) according to the target point setting information based on 2) the second image sensor 521.

At this time, in the present embodiment, the processor may control an image capture direction of the display device 520 mounted on the body 510 of the robot 500 using a fixing part, and through this, the processor may perform a functional operation of controlling the image capture direction of the second image sensor 521.

In detail, the processor may perform movement control of the robot 500 and/or control of the image capture direction of the display device 520 based on the acquired target point setting information.

In detail, the processor may move the robot 500 based on the acquired target point setting information.

In more detail, the processor may move the robot 500 to a specific point on the base map included in the target point setting information or a target location of a specific object in conjunction with the moving unit 540. That is, the processor may move the robot 500 so that the target location becomes the current location of the robot 500.

Alternatively, according to an embodiment, the processor may control the image capture direction of the display device 520 based on the acquired target point setting information.

In detail, the processor may control the fixing part of the body 510 of the robot 500 to change the image capture direction of the display device 520 mounted on the body 510 of the robot 500 according to the target point setting information, and through this, the processor may control the image capture direction of the second image sensor 521 included in the display device 520 to face a specific point of the target point setting information or a target location indicated by the target location information for a specific object.

In this case, according to an embodiment, the processor may further provide a gimbal function to prevent shaking of the second image sensor 521 by interworking with a predetermined gimbal device to minimize deterioration of the quality of the sub-field image captured through the second image sensor 521 due to the shaking.

In addition, in the present embodiment, the processor may acquire a sub-field image by capturing an image capture area of the predetermined second image sensor 521 determined based on the current location after movement (i.e., the target location) and/or the image capture direction of the display device 520.

Again, in an embodiment, the processor acquiring the captured image based on the target point setting information as described above may determine a location to display the AR-based work information on the acquired image (in an embodiment, the field image and/or the sub-field image).

For example, the processor may set at least a portion of a peripheral area including an area within a predetermined distance from a predetermined object in the captured image as a location to display the AR-based work information.

In addition, in an embodiment, the processor may display and provide the AR-based work information on the determined location.

In detail, in an embodiment, the processor may display the AR-based work information on the display position determined for the captured image (in an embodiment, the field image and/or the sub-field image).

In addition, the processor may output and provide a captured image (in an embodiment, the field image and/or sub-field image) on which the AR-based work information is displayed by interworking at least one of the display device 520, the remote administrator terminal 2000 and/or the field user terminal 1000.

Therefore, the processor may set a point to provide the AR-based work information based on a base map for managing the target worksite area from a macroscopic point of view, and display and provide the AR-based work information on the captured image for the set point.

Figure 15:
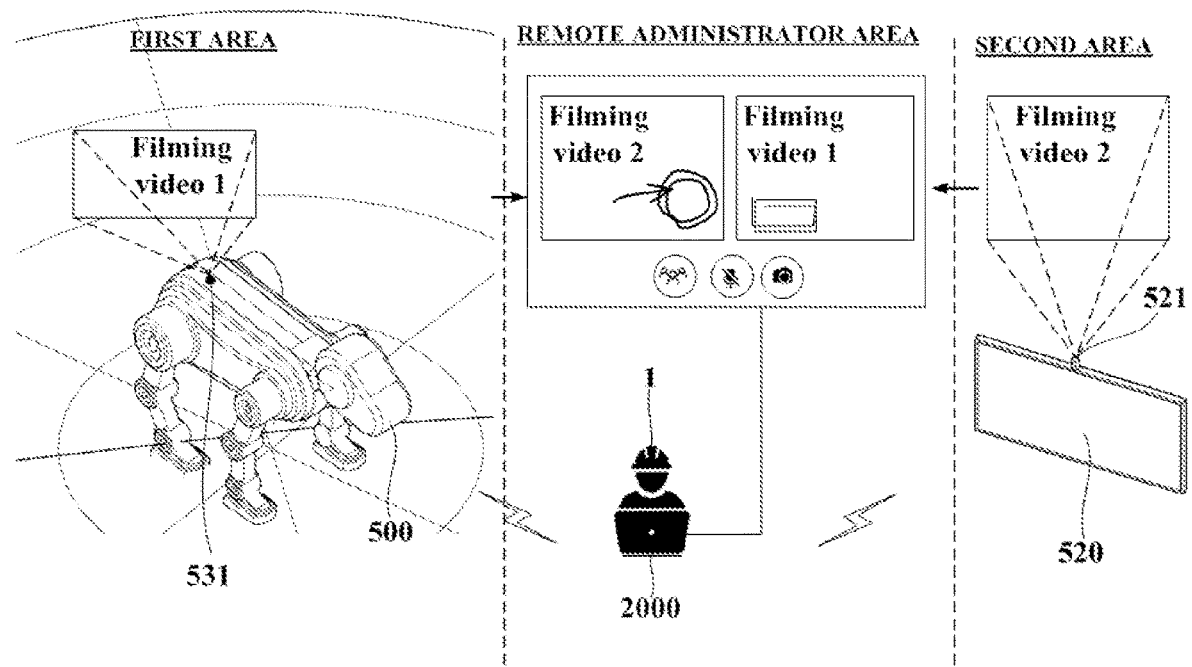
FIG. 15 is a conceptual diagram illustrating a method for providing augmented reality-based work information based on a plurality of images of different worksites according to an embodiment of the present disclosure.

FIG. 15 is a conceptual diagram illustrating a method for providing AR-based work information based on a plurality of images of different worksites according to an embodiment of the present disclosure.

Also, referring to FIG. 15, according to an embodiment, the processor may provide AR-based work information based on 3) a plurality of images of different worksites.

In detail, the display device 520 of the robot 500 according to an embodiment of the present disclosure may be mounted on the body 510 of the robot 500 or may be spaced apart to operate as a separate device.

Here, when the display device 520 is spaced apart from the body 510 of the robot 500, the processor according to an embodiment may acquire a field image of the current reference area in which the robot 500 is located and a sub-field image of the peripheral area at a location separated from the robot 500.

That is, the processor may acquire a field image obtained by capturing a predetermined first area (i.e., the current reference area of the robot 500) using the first image sensor 531 and a sub-field image obtained by capturing a predetermined second area different from the first area by using the second image sensor 521.

In addition, the processor may provide AR-based work information based on a plurality of images including the obtained field image and the sub-field image as described above.

Therefore, the processor may acquire a plurality of captured images based on different areas in the target worksite based on the first and second image sensors 521 included in one robot 500 and augmentedly display and provide AR-based work information based thereon.

Meanwhile, according to an embodiment, the processor may match the AR-based work information as above to an area corresponding to the corresponding AR-based work information (in an embodiment, an area in which a predetermined captured image is obtained, etc.) and store and manage the same.

In an embodiment, the processor may store and manage the AR-based work information in the storage unit 570 by matching the AR-based work information to the corresponding area, and match the AR-based work information to the corresponding area and transmit the same to the field user terminal 1000 and/or the remote administrator terminal 2000 to be stored and managed.

In addition, when an abnormal situation is detected in the corresponding area later (that is, when detecting a specific environment (SE) preset in an embodiment, etc.), when the field worker 2 requests the AR-based work information from the corresponding area based on the field user terminal 1000 and/or display device 520 and/or when the remote administrator 1 requests AR-based work information for the corresponding area based on the remote administrator terminal 2000, the processor may read and provide the AR-based work information matched to the corresponding area.

Accordingly, the processor may further improve the usability and convenience of the AR-based work information providing service using the robot 500 patrolling the target worksite area.

Also, in an embodiment, the processor may provide AR-based feedback information (hereinafter, feedback information) (S113).

Figure 16:
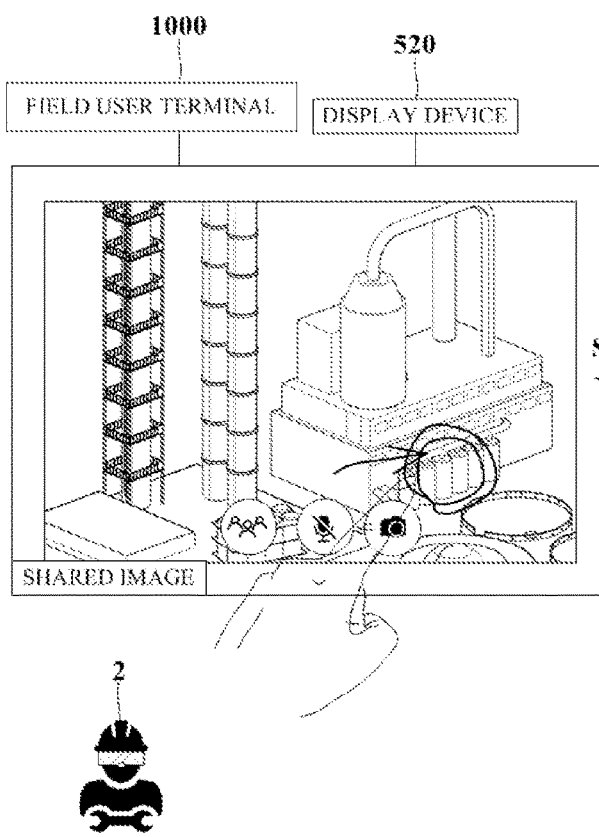
FIG. 16 is a conceptual diagram illustrating a method for providing augmented reality-based feedback information according to an embodiment of the present disclosure.
Figure 16:
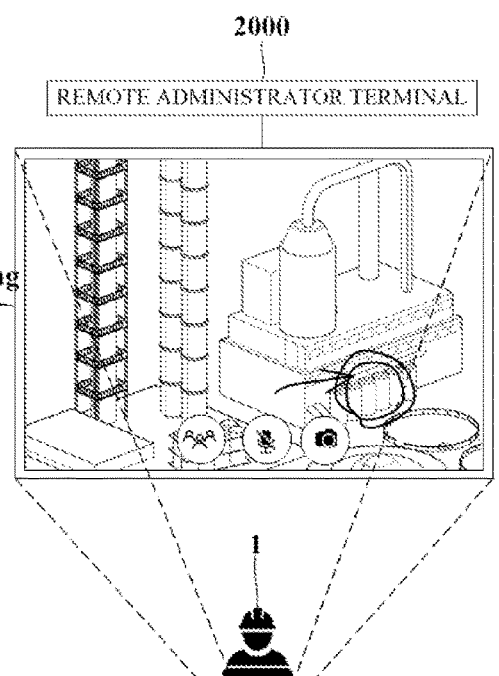

FIG. 16 is a conceptual diagram illustrating a method for providing AR-based feedback information according to an embodiment of the present disclosure.

Referring to FIG. 16, the feedback information according to an embodiment may include virtual content that provides work feedback based on an input of the field worker 2 located at a worksite. In this case, the field worker 2 according to an embodiment may be a person who performs actual work based on the AR-based work information received from the remote administrator 1 at the corresponding worksite.

In an embodiment, the feedback information may include virtual content that provides work feedback based on text, pointing, image, drawing and/or voice data based on an input of the field worker 2 using the field user terminal 1000 and/or the display device 520.

In this case, the work feedback may include, for example, work inquiry information, work progress information, and/or work request information.

In detail, in an embodiment, the processor may acquire feedback information according to an input of the field worker 2 based on the field user terminal 1000 by interworking with the field user terminal 1000.

Alternatively, according to an embodiment, the processor may acquire feedback information according to an input of the field worker 2 based on the display device 520.

That is, in an embodiment, the processor may acquire feedback information including virtual content based on text, pointing, image, drawing and/or voice data input by the field worker 2 using the field user terminal 1000 and/or the display device 520 to provide the feedback information for the predetermined work.

At this time, in an embodiment, the processor may acquire the feedback information 1) based on an image captured using a predetermined image sensor, 2) based on a base map, and 3) based on a plurality of images of different worksites. A detailed description of the method for acquiring the feedback information through the above various methods is replaced with a description of the method for acquiring the AR-based work information in the step S111 of providing the aforementioned AR-based work information.

In addition, in an embodiment, the processor may output and provide the captured image (in an embodiment, field image, sub-field image, user image, and/or field camera image, etc.) on which the feedback information acquired as described above is displayed, by interworking at least one of the display device 520, the remote administrator terminal 2000 and/or the field user terminal 1000.

Accordingly, the processor may provide remote collaboration service implementing two-way communication based on the AR environment to transfer virtual content-based work guidance generated from the remote administrator 1 to the field worker 2 and transfer the virtual content-based work feedback generated from the field worker 2 to the remote administrator 1.

As described above, the method and system for a remote collaboration according to an embodiment of the present disclosure may perform augmented reality (AR)-based communication between multiple users using a robot to support AR-based communication for the worksite even if manpower is directly put into a hazardous worksite where various accident-inducing factors are scattered or hazardous substances exist or even if there is no separate device (e.g., CCTV, etc.) for observing the worksite, thereby security safety in the field and improving work efficiency.

In addition, the method and system for a remote collaboration according to an embodiment of the present disclosure perform AR-based communication between multiple users based on a robot to efficiently provide various data and/or information required for work to the corresponding worksite, thereby improving work efficiency.

In addition, the method and system for a remote collaboration according to an embodiment of the present disclosure allow an administrator located remotely from a worksite and a worker located in the worksite to perform AR-based communication using a robot, thereby easily transferring equipment (e.g., a valve wrench or calibrator, etc.), which is inconvenient to be delivered through manpower, through the robot.

In addition, the method and system for a remote collaboration according to an embodiment of the present disclosure perform AR-based communication based on images captured using various image sensors including an image sensor of a robot, an image sensor of a display device included in the robot, an image sensor of a terminal of a field worker, and/or a predetermined image sensor installed in the field to display and provide, as virtual content, AR-based work information related to a region in a worksite, for which a work guidance is to be provided, on an image of the corresponding region, thereby providing communication data mutually exchanged in a form that may be easily and clearly recognized even in a work environment where communication is difficult.

In addition, the method and system for a remote collaboration according to an embodiment of the present disclosure perform AR-based communication based on a base map for a worksite to be monitored so that a remote administrator and/or a field worker recognize a status of the worksite in real time from a macroscopic point of view and easily exchange interrelated information.

The embodiment of the present disclosure described above may be implemented as computer commands which may be executed through various computer components and recorded in a computer-readable recording medium. The computer-readable recording medium may include program instructions, data files, data structures or a combination thereof. Program instructions recorded on the computer-readable recording medium may be particularly designed and structured for the present disclosure or available to those skilled in computer software. Examples of the computer-readable recording medium include hardware devices particularly configured to store and perform program instructions, such as magnetic mediums, such as a hard disk, a floppy disk, and a magnetic tape, optical mediums, such as a compact disk-read only memory (CD-ROM) and a digital versatile disc (DVD), magneto-optical mediums, such as floptical disks, a read-only memory (ROM), a random access memory (RAM), and a flash memory. The program instructions may include, for example, a high-level language code that may be executed by a computer using an interpreter, as well as a machine language code made by a complier. The hardware device described herein may changed to one or more software modules to perform processing according to the present disclosure, and vice versa.

The specific executions described in the present disclosure are embodiments and do not limit the scope of the present disclosure by any method. For simplicity of the specification, electronic components, control systems, software, and other functional factors in the related art may be omitted. In addition, connection of lines or connection members between the components in the drawings illustrate functional connection and/or physical or circuital connection as example, and thus in a real apparatus, replaceable or additional diverse functional connection, physical connection or circuital connection may be provided. Also, they may not necessarily be essential components for application of the present disclosure unless specifically mentioned such as by "essential" or "importantly".

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A method for a remote collaboration, as a method for providing an augmented reality (AR)-based remote collaboration between a robot located in a worksite, a field worker terminal, and a remote administrator terminal located outside the worksite, the method comprising:
    acquiring a captured image including a field image captured by a robot located at the worksite or a captured image including a user image captured by the field worker terminal;
    displaying the captured image of the worksite;
    generating virtual content based on an input of a remote administrator and a field worker with respect to the displayed captured image; and
    displaying an AR image in which the virtual content is augmented on the displayed captured image,
    wherein the displaying of the AR image in which the virtual content is augmented on the displayed captured image includes at least one of displaying the AR image in the field worker terminal; displaying the AR image in the remote administrator terminal; and the AR image on a display device disposed on the robot,
    wherein the display device is a computing device detachably disposed in a body of the robot and connected to the robot for wireless or wired communication, and the acquiring of the captured image includes acquiring a sub-field image captured by the display device detachable from the robot, and
    wherein the generating of the virtual content based on an input of the remote administrator and the field worker for the displayed captured image includes:
    displaying the field image in the remote administrator terminal and generating the virtual content according to the input of the remote administrator from the displayed field image, and
    the displaying of the AR image on the display device disposed on the robot includes displaying an AR image in which the virtual content is augmented on the field image captured by the robot.

2. The method of claim 1, wherein
    the generating of the virtual content based on the input of the remote administrator and the field worker with respect to the displayed captured image includes:

acquiring virtual content that visualizes work guidance to be transferred from the remote administrator terminal to the field worker,
wherein the work guidance includes at least one of text, pointing, image, drawing, and voice data based on a user input of the remote administrator terminal.

3. The method of claim 2, wherein
the generating of the virtual content based on the input of the remote administrator and the field worker with respect to the displayed captured image includes:
obtaining virtual content that visualizes a work feedback to be displayed on the remote administrator terminal from the field worker terminal,
wherein the work feedback includes at least one of text, pointing, image, drawing, and voice data based on a user input of the field worker terminal.

4. The method of claim 1, further comprising:
separating the display device from the robot;
activating a real-time movement direction input interface for controlling movement of the robot in the display device;
controlling the robot to move based on a user input to the real-time movement direction input interface; and
acquiring a real-time field image captured by the moved robot and displaying the real-time field image on the display device and the remote administrator terminal.

5. The method of claim 1, further comprising:
receiving work guidance for a point or object other than the real-time field image from the remote administrator terminal; and
augmenting and displaying virtual content for guiding a location of the work guidance in the real-time field image.

6. The method of claim 5, wherein
the virtual content for guiding a position of the work guidance is a navigation image indicating a direction in which the robot is to move in order to image a position of the point or object.

7. The method of claim 1, further comprising:
receiving a work guidance for a past field image captured by the robot before moving from the remote administrator terminal; and
comparing the real-time field image captured by the robot with the past field image and determining a display position of the work guidance in the real-time field image.

8. The method of claim 1, further comprising:
displaying a base map for the worksite in the remote administrator terminal;
receiving a user input from the remote administrator terminal for the displayed base map; and
augmenting and displaying virtual content on the captured image based on the received user input.

9. The method of claim 8, wherein
the receiving of a user input from the remote administrator terminal for the displayed base map includes:
receiving a work guidance for a predetermined point or a predetermined object in the base map, and
the augmenting and displaying of virtual content on the captured image based on the received user input includes:
acquiring the captured image of a target area including the predetermined point or the predetermined object;
determining a display position of the work guidance based on the acquired captured image; and
outputting the captured image augmented with the virtual content representing the work guidance based on the determined display position.

10. The method of claim 9, wherein
the acquiring of the captured image for the area including the predetermined point or the predetermined object includes:
controlling an image capture direction of the display device disposed on the robot to image the target area; and
controlling movement of the robot to image the target area.

* * * * *